(12) United States Patent
Li et al.

(10) Patent No.: US 11,442,912 B2
(45) Date of Patent: Sep. 13, 2022

(54) BLOCKCHAIN-BASED INFORMATION PROCESSING METHOD AND APPARATUS AND COMPUTER-READABLE STORAGE MEDIUM

(71) Applicant: Tencent Technology (Shenzhen) Company Limited, Shenzhen (CN)

(72) Inventors: Maocai Li, Shenzhen (CN); Zongyou Wang, Shenzhen (CN); Hu Lan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 114 days.

(21) Appl. No.: 17/166,948

(22) Filed: Feb. 3, 2021

(65) Prior Publication Data
US 2021/0157778 A1 May 27, 2021

Related U.S. Application Data

(63) Continuation of application No. PCT/CT2020/083137, filed on Apr. 3, 2020.

(30) Foreign Application Priority Data

Apr. 19, 2019 (CN) .......................... 201910319332.9

(51) Int. Cl.
*G06F 16/30* (2019.01)
*G06F 16/22* (2019.01)
*G06F 16/2455* (2019.01)

(52) U.S. Cl.
CPC .......... *G06F 16/22* (2019.01); *G06F 16/2455* (2019.01)

(58) Field of Classification Search
CPC ............................ G06F 16/22; G06F 16/2455
(Continued)

(56) References Cited

U.S. PATENT DOCUMENTS

| | | | |
|---|---|---|---|
| 1,118,907 A | * | 11/1914 | Nordlie .................... G01C 9/28 33/451 |
| 9,256,764 B2 | * | 2/2016 | Aissi ....................... G06F 21/64 |

(Continued)

FOREIGN PATENT DOCUMENTS

| CN | 101802836 A | 8/2010 |
|---|---|---|
| CN | 103761487 A | 4/2014 |

(Continued)

OTHER PUBLICATIONS

Tencent Technology, ISR, PCT/CN2020/083137, dated Jul. 2, 2020, 2 pgs.

(Continued)

*Primary Examiner* — Sana A Al-Hashemi
(74) *Attorney, Agent, or Firm* — Morgan, Lewis & Bockius LLP

(57) ABSTRACT

Embodiments of this application provide a blockchain-based information processing method, including: obtaining an original index information set, the original index information set comprising at least one piece of original index information, each piece of original index information comprising plaintext sensitive content; obtaining information in to-be-matched blocks in a blockchain system, the information comprising information content and an information index, the information content having a correspondence with the information index; matching the information content in the information by using the original index information set, to obtain a matching result; and determining a variant index information set when the matching result indicates that the matching succeeds, the variant index information set com- (Continued)

prising at least one piece of variant index information, the variant index information comprising the information index corresponding to the information content in the information.

20 Claims, 10 Drawing Sheets

(58) Field of Classification Search
USPC ........ 707/609, 687, 705, 769, 790, 813, 821
See application file for complete search history.

(56) References Cited

U.S. PATENT DOCUMENTS

| | | | |
|---|---|---|---|
| 2011/0044665 A1* | 2/2011 | Okubo | G11B 20/00869 386/354 |
| 2011/0191400 A1* | 8/2011 | Das Gupta | G06N 20/00 706/12 |
| 2011/0238696 A1* | 9/2011 | Zeller | G06F 16/951 707/769 |
| 2016/0098723 A1 | 4/2016 | Feeney | |
| 2017/0076109 A1 | 3/2017 | Kaditz et al. | |
| 2019/0114626 A1 | 4/2019 | Pogorelik et al. | |

FOREIGN PATENT DOCUMENTS

| | | |
|---|---|---|
| CN | 108875407 A | 11/2018 |
| CN | 108920975 A | 11/2018 |
| CN | 109086325 A | 12/2018 |
| CN | 109145643 A | 1/2019 |
| CN | 109529367 A | 3/2019 |
| CN | 109558748 A | 4/2019 |
| CN | 110020554 A | 7/2019 |
| CN | 110598463 A | 12/2019 |
| EP | 3096245 A1 | 11/2016 |
| JP | 2006189925 A | 7/2006 |
| JP | 2010231717 A | 10/2010 |
| JP | 2013097479 A | 5/2013 |
| JP | 2014186427 A | 10/2014 |
| JP | 201802225 8 A | 2/2018 |

OTHER PUBLICATIONS

Tencent Technology, WO, PCT/CN2020/083137, Jul. 2, 2020, 4 pgs.
Tencent Technology, IPRP, PCT/CN2020/083137, Sep. 28, 2021, 5 pgs.

* cited by examiner

BLOCKCHAIN-BASED INFORMATION PROCESSING METHOD AND APPARATUS AND COMPUTER-READABLE STORAGE MEDIUM

CROSS REFERENCE TO RELATED APPLICATIONS

This application is a continuation application of PCT Patent Application No. PCT/CN2020/083137, entitled "INFORMATION PROCESSING METHOD AND DEVICE BASED ON BLOCKCHAIN, AND COMPUTER-READABLE STORAGE MEDIUM" filed on Apr. 3, 2020, which claims priority to Chinese Patent Application No. 201910319332.9, filed with the State Intellectual Property Office of the People's Republic of China on Apr. 19, 2019, and entitled "BLOCKCHAIN-BASED INFORMATION PROCESSING METHOD AND APPARATUS AND COMPUTER-READABLE STORAGE MEDIUM", all of which are incorporated herein by reference in their entirety.

FIELD OF THE TECHNOLOGY

This application relates to the field of computer technologies, and in particular, to a blockchain-based information processing method and apparatus and a computer-readable storage medium.

BACKGROUND OF THE DISCLOSURE

With the development of computer technologies, a blockchain data processing technology keeps developing. A blockchain technology (BT) is also referred to as a distributed ledger technology and is an Internet database technology that features decentralization, openness, and transparency, enabling all people to participate in database recording. Currently, blockchains mainly include a public blockchain, a private blockchain, a consortium blockchain, a permissioned blockchain, and a hybrid blockchain.

The security of transaction information needs to be considered for BT-based transactions. A currently adopted solution is implemented based on a plaintext sensitive thesaurus. Specifically, a service provider maintains a plaintext sensitive thesaurus. When a user needs to detect and filter content, original content is transmitted to a server. The server uses the plaintext sensitive thesaurus to compare and filter the original content provided by the user, and then returns a result to a client. After receiving the filtered content and a detection result, the client may perform subsequent processing.

However, the currently adopted sensitive thesaurus is maintained in a centralized organization in the form of plaintext. When the sensitive thesaurus needs to be updated, a plaintext sensitive thesaurus file is usually used for synchronizing latest sensitive words. Therefore, if a cover file of the sensitive thesaurus leaks during synchronization, potential security hazards occur in transaction information, causing a series of social harms.

SUMMARY

Embodiments of this application provide a blockchain-based information processing method and apparatus and a computer-readable storage medium. A record of index information is no longer maintained in plaintext, but an index of the index information involved during a blockchain transaction is recorded, thereby forming variant index information. The variant index information does not directly display specific content of the index information, but is maintained in the form of the index, so that potential security hazards are less likely to occur, and the security of information maintenance is improved.

An aspect of this application provides a blockchain-based information processing method, performed by a network node device, and including:

obtaining an original index information set, the original index information set including at least one piece of original index information, each piece of original index information including plaintext sensitive content;

obtaining information in to-be-matched blocks in a blockchain system, the information including information content and an information index, the information content having a correspondence with the information index;

matching the information content in the information by using the original index information set, to obtain a matching result; and determining a variant index information set when the matching result indicates that the matching succeeds, the variant index information set comprising at least one piece of variant index information, the variant index information comprising the information index corresponding to the information content in the information.

An aspect of this application provides a blockchain-based information processing method, performed by a network node device, and including:

receiving request information from a client, the request information carrying a to-be-detected information index;

detecting, by using a variant index information set, the to-be-detected information index carried by the request information, to obtain a detection result, the variant index information set including at least one piece of variant index information, the variant index information including an information index in information;

obtaining information content corresponding to the to-be-detected information index;

processing the information content corresponding to the to-be-detected information index according to the detection result, to obtain processed information; and transmitting the processed information to the requesting client, to display the processed information.

An aspect of this application provides a blockchain-based data processing apparatus, including:

an obtaining module, configured to obtain an original index information set, the original index information set including at least one piece of original index information, each piece of original index information including plaintext sensitive content, the obtaining module being further configured to obtain information in to-be-matched blocks in a blockchain system, the information including information content and an information index, the information content having a correspondence with the information index;

a matching module, configured to match the information content in the information by using the original index information set obtained by the obtaining module, to obtain a matching result; and a determining module, configured to determining a variant index information set when the matching result indicates that the matching succeeds, the variant index information set comprising at least one piece of variant index information, the variant index information comprising the information index corresponding to the information content in the information.

In a possible design, the matching module is configured to: match first information content by using the original index information set, the first information content being part of the information; and match information content in a second block in a case that the first information content is the last piece of information in a first block, the first block being a block of the to-be-matched blocks, the second block being another block of the to-be-matched blocks, the second block being a next block adjacent to the first block; or obtain second information content in a first block in a case that the first information content is not the last piece of information in the first block, and match the second information content by using the original index information set, the second information content being a next piece of information content adjacent to the first information content.

In a possible design, the determining module is configured to: obtain a sensitivity level of the original index information in a case that the matching result is that the information successfully matches the original index information in the original index information set;

obtain a hash value, an intra-block index, and a block height in the information index, the intra-block index representing a position of the information in the to-be-matched block; and generate the variant index information set according to the sensitivity level, the hash value, the intra-block index, and the block height of the original index information.

In a possible design, the blockchain-based data processing apparatus further includes a processing module, where the processing module is configured to: receive request information after the determining module determines a variant index information set, the request information carrying a to-be-detected information index;

detect the to-be-detected information index by using the variant index information set, to obtain a detection result; and process the request information according to the detection result.

In a possible design, the processing module is configured to: determine a target hash value according to the to-be-detected information index;

match the target hash value by using the variant index information set;

determine, when the target hash value successfully matches the variant index information in the variant index information set, that information content corresponding to the to-be-detected information index is sensitive information; and determine, when the target hash value fails to match the variant index information in the variant index information set, that information content corresponding to the to-be-detected information index is secure information.

In a possible design, the processing module is configured to: determine a target intra-block index and a target block height according to the to-be-detected information index;

match the target intra-block index and the target block height by using the variant index information set;

determine, when the target intra-block index and the target block height successfully match the variant index information in the variant index information set, that the to-be-detected information index is sensitive transaction information; and determine, when the target intra-block index and the target block height fail to match the variant index information in the variant index information set, that information content corresponding to the to-be-detected information index is secure information.

In a possible design, the processing module is configured to: obtain target information content according to the to-be-detected information index when information content corresponding to the to-be-detected information index is secure information; and transmit the target information content to the requesting client, to enable the client to display the target information content.

In a possible design, the processing module is configured to: determine a target sensitivity level and a target service type according to the to-be-detected information index when information content corresponding to the to-be-detected information index is sensitive information;

determine, according to the target sensitivity level and the target service type, whether to display target information content corresponding to the to-be-detected information index;

transmit prompt information to the client in a case of determining not to display the target information content, to enable the client to display the prompt information, the prompt information being used for prompting a user that the target information content is the sensitive information; and process the target information content in a case of determining to display the target information content, to obtain processed target information content, and transmit the processed target information content to the client, to enable the client to display the processed target information content.

In a possible design, the processing module is configured to: obtain the target information content;

match the target information content by using the original index information set, and determine target index information in the target information content; and block the target index information in the target information content, to obtain the processed target information content.

An aspect of this application provides a blockchain-based data processing apparatus, including:

a receiving module, configured to receive request information from a client, the request information carrying a to-be-detected information index;

a detection module, configured to detect, by using a variant index information set, the to-be-detected information index carried by the request information, to obtain a detection result, to obtain a detection result, the variant index information set including at least one piece of variant index information, the variant index information including an information index in information;

an obtaining module, configured to obtain information content corresponding to the to-be-detected information index;

a processing module, configured to process the information content corresponding to the to-be-detected information index according to the detection result, to obtain processed information; and a transmission module, configured to transmit the processed information to the client, to display the processed information.

An aspect of this application provides a network node device, including a memory and a processor, the memory being configured to store a program;

the processor being configured to execute the program in the memory, to perform the following operations:

obtaining an original index information set, the original index information set including at least one piece of original index information, each piece of original index information including plaintext sensitive content;

obtaining information in to-be-matched blocks in a blockchain system, the information including information content and an information index, the information content having a correspondence with the information index;

matching the information content in the information by using the original index information set, to obtain a matching result; and determining a variant index information set when the matching result indicates that the matching succeeds, the variant index information set comprising at least one piece of variant index information, the variant index information comprising the information index corresponding to the information content in the information.

An aspect of this application provides a network node device, including a memory and a processor, the memory being configured to store a program;

the processor being configured to execute the program in the memory, to perform the following operations:

receiving request information from a client, the request information carrying a to-be-detected information index;

detecting, by using a variant index information set, the to-be-detected information index carried by the request information, to obtain a detection result, the variant index information set including at least one piece of variant index information, the variant index information including an information index in information;

obtaining information content corresponding to the to-be-detected information index;

processing the information content corresponding to the to-be-detected information index according to the detection result, to obtain processed information; and transmitting the processed information to the client, to display the processed information.

According to an aspect of this application, a non-transitory computer-readable storage medium is provided, storing instructions, the instructions, when run on a computer, causing the computer to perform the foregoing methods.

According to the foregoing technical solutions, it can be learned that the embodiments of this application have the following advantages:

In the embodiments of this application, a blockchain-based information processing method is provided. First, an original index information set is obtained, the original index information set including at least one piece of original index information, each piece of original index information including plaintext sensitive content; and information in a to-be-matched block is then obtained, the information including information content and an information index, the information content having a correspondence with the information index; and the information content in the information is matched by using the original index information set, to obtain a matching result, and a variant index information set is determined according to the matching result when the matching result indicates that the matching succeeds, the variant index information set including at least one piece of variant index information, the variant index information including the information index corresponding to the information content in the information. Through the foregoing methods, a record of index information is no longer maintained in plaintext, but an information index of the index information involved during a blockchain transaction is recorded, thereby forming variant index information. The variant index information does not directly display specific content of the index information, but is maintained in the form of the information index, so that potential security hazards are less likely to occur, and the security of information maintenance is improved.

DESCRIPTION OF EMBODIMENTS

Figure 1:
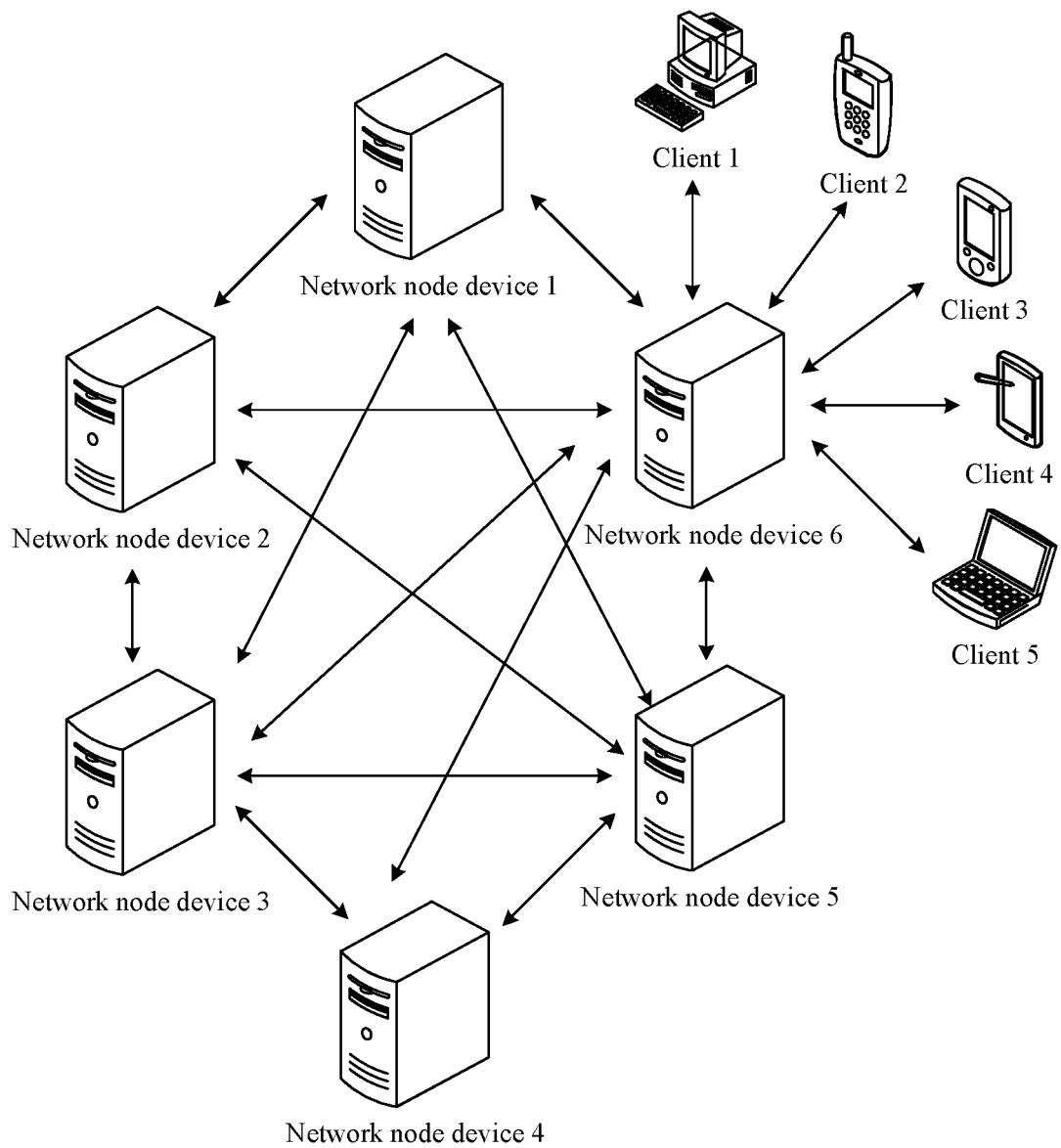
FIG. 1 is a schematic architectural diagram of a blockchain-based information processing system according to an embodiment of this application.

Embodiments of this application provide a blockchain-based information processing method and apparatus and a computer-readable storage medium. A record of index information is no longer maintained in plaintext, but an index of the index information involved during a blockchain transaction is recorded, thereby forming variant index information. The variant index information does not directly display specific content of the index information, but is maintained in the form of the index, so that potential security hazards are less likely to occur, and the security of information maintenance is improved.

In the specification, claims, and accompanying drawings of this application, the terms "first", "second", "third", "fourth", and so on (if existing) are intended to distinguish between similar objects rather than describe a specific order or sequence. It may be understood that the data termed in such a way is interchangeable in proper circumstances, so that the embodiments of this application described herein for example, can be implemented in other orders than the order illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that the information processing method provided by this application is applicable to a blockchain system. The blockchain is a record-keeping technology in which multiple parties carry out maintenance, transmission and access security is ensured by using cryptography, and consistent data storage, tamper resistance, and non-repudiation can be achieved. The technology is also referred to as a distributed ledger technology. A typical blockchain stores data in a block-chain structure.

This application may be specifically applied to a public blockchain, a private blockchain or a consortium blockchain. The public blockchain has no official organization, no management organization, and no central server. Participating nodes freely access a network according to a system rule and without any control, and the nodes perform work based on a consensus mechanism. A private blockchain is established within a group. An operation rule of a system is set according to requirements of the group, and modification or read rights are restricted to some extent. Meanwhile, features including authenticity of the blockchain and partial decentralization are preserved. A consortium blockchain is jointly initiated by several mechanisms and is a concept that lies between a public blockchain and a private blockchain, and has a feature of partial decentralization. Read rights on the blockchain may be open to public or partially open to public. That is, a plurality of pre-selected nodes are internally appointed as record keepers. The record keepers contest for a record-keeping right, and other access nodes may participate in transactions but skips interfering a record-keeping process.

For ease of understanding, this application provides a blockchain-based information processing method. The method is applicable to an information processing system shown in FIG. 1. FIG. 1 is a schematic architectural diagram of a blockchain-based information processing system according to an embodiment of this application. As shown in the figure, the architecture of the information processing system may include distributed nodes (for example, a network node device 1, a network node device 2, a network node device 3, a network node device 4, a network node device 5, and a network node device 6). The distributed nodes are connected by a communication link. For example, the distributed nodes may be connected by a wired communication link or a wireless communication link. The plurality of distributed nodes jointly form a blockchain network. A quantity of the distributed nodes (six distributed nodes) shown in FIG. 1 is merely used as an example. Any quantity of distributed nodes may be deployed according to an actual requirement.

In an embodiment of this application, the network node devices may generate transaction information according to update information of public configuration parameters (for example, a node quantity, a block size, and a block generation period) in the blockchain network. The transaction information is then broadcast in the blockchain network. The network node devices in the blockchain network may verify and validate the transaction information. After the network node devices in the blockchain network reach a consensus on the transaction information, the public configuration parameters may be updated according to the transaction information, the public configuration parameters are updated during the operation of the blockchain nodes, thereby improving the update efficiency of the public configuration parameters.

For any network node device in the foregoing blockchain, a user may initiate a transaction request to the network node device by using a client. The transaction request carries a to-be-detected information index. The network node device uses a variant index information set to detect the to-be-detected information index in the transaction request, to obtain a detection result. In a case that the detection result shows that the to-be-detected information index does not have sensitive information, the network node device may obtain target information content corresponding to the transaction request from another network node device, and transmit the target information content to the client. The client displays the target information content in plaintext. Otherwise, in a case that the detection result shows that the to-be-detected information index has sensitive information, the target information content involving index information needs to be completely blocked or partially blocked. The client is deployed on a terminal device. The terminal device includes, but is not limited to, a tablet computer, a notebook computer, a palmtop computer, a mobile phone, and a personal computer (PC), and is not limited herein.

Figure 2:
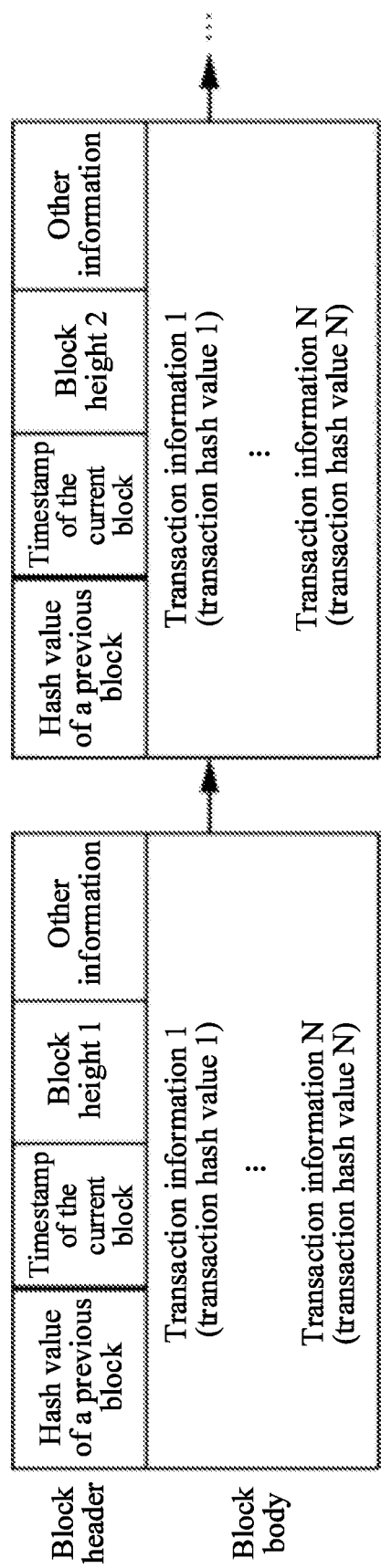
FIG. 2 is a schematic structural composition diagram of a block according to an embodiment of this application.

FIG. 2 is a schematic structural composition diagram of a block according to an embodiment of this application. As shown in the figure, a blockchain is formed by a plurality of blocks. The blocks are data organization units in a blockchain network and are connected in series by a linked list. The block includes a block header and a block body. The block header includes a hash value of a previous block, a timestamp of the current block, a block height, and other information. The hash value of a previous block is used for linking the block and the previous block in the blockchain. The timestamp of the current block is used for determining the generation time of the block. The block height is used for representing a position of the block in the blockchain. Other information includes a Merkle root, a difficulty target, and a random value of the block body. The block body includes transaction information, for example, "A transfers 50 bitcoins to B". Each piece of transaction information corresponds to a hash value. The hash value can uniquely and accurately identify a piece of transaction information, and each block maintains the same transaction information.

Figure 3:
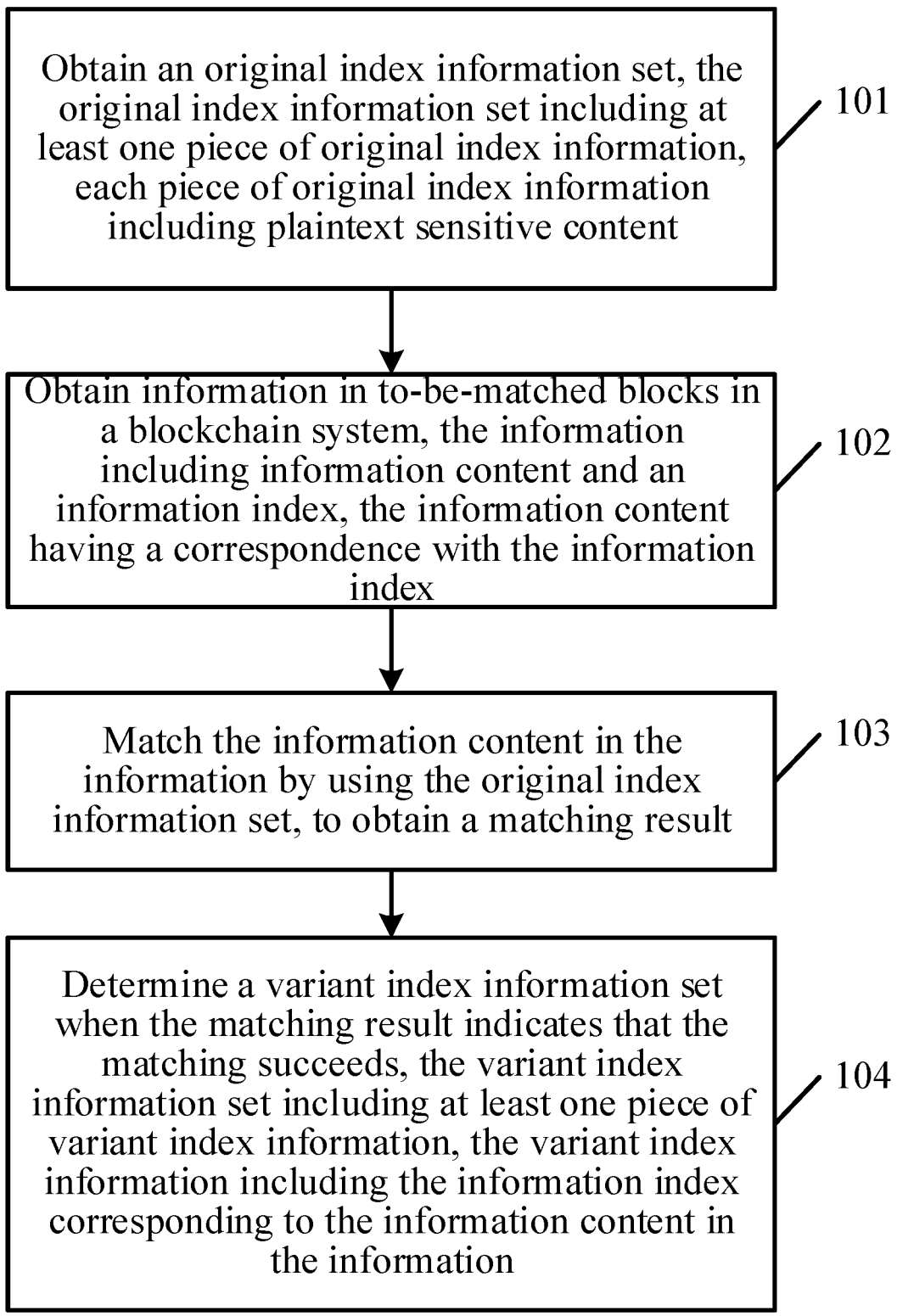
FIG. 3 is a schematic diagram of an embodiment of a blockchain-based information processing method according to an embodiment of this application.

The following describes a blockchain-based information processing method in this application with reference to the foregoing description. The blockchain-based information processing method may be performed by a computer device. The computer device may be the network node device in FIG. 1. Referring to FIG. 3, an embodiment of the blockchain-based information processing method in the embodiments of this application includes the following steps:

101: Obtain an original index information set, the original index information set including at least one piece of original index information, each piece of original index information including plaintext sensitive content.

In this embodiment, an information processing apparatus in the network node device first needs to obtain an original index information set. The original index information set includes a word and phrase set related to information about pornography, violence, reaction, and fraud. The original index information set may be specifically a thesaurus and represented in a table structure. Table 1 is an example of the original index information set.

TABLE 1

| Column name | Data type | Description |
| --- | --- | --- |
| ID | Int32 | Unique ID of original index information |
| Sensitivity level | Int8 | Sensitivity level:<br>1: Common sensitivity<br>2: Intermediate sensitivity<br>3: High sensitivity |
| Index information content | String | Original sensitive content may be a common word or a regular expression. |

As shown in Table 1, one piece of original index information corresponds to a unique identification (ID). The original index information is usually a word or may be a character or a sentence. The sensitivity level represents a sensitivity degree of the original index information. Original index information of different levels may be processed differently. The index information content is specifically a word or sentence, and may be represented by a common word, and may also be represented through a regular expression. The data type corresponding to the ID is a signed 32-bit integer and occupies four bytes. The data type corresponding to the sensitivity level is a signed 8-bit integer and occupies one byte. The data type corresponding to the index information content is a string. It may be understood that Table 1 is merely an example, but is not to be understood as a limitation to the original index information set.

102: Obtain information in to-be-matched blocks in a blockchain system, the information including information content and an information index, the information content having a correspondence with the information index.

In this embodiment, the information processing apparatus obtains information in a to-be-matched block. It is assumed that there are N blocks in a blockchain and all the N blocks may be used as to-be-matched blocks. Each block has corresponding information. The information specifically includes information content and an information index. The information content includes a user-defined field. The information index may include a hash value, an intra-block index, and a block height.

It may be understood that each block has a block height. The block height represents a position of the block in the blockchain, that is, a position away from a first block. The block height of the first block is defined to be 0. Based on this, subsequent block heights sequentially increase. The block height is not a unique identifier of the block, because the blockchain may diverge, producing two or more blocks at the same height. That is, one block has a unique block height, but one block height does not correspond to a unique block. Each piece of information content in the block corresponds to a unique hash value. Each piece of information content has one intra-block index. It is assumed that the blockchain is a ledger. The block is a piece of paper in the ledger. Each piece of information content is recorded in a line on the paper. The intra-block index represents the line number and page number of information content in the ledger.

103: Match the information content in the information by using the original index information set, to obtain a matching result.

In this embodiment, the information processing apparatus matches each piece of information content in the information content against the original index information in the original index information set, to obtain a matching result of each piece of information content. For example, information content 1 is "A makes a top-up of 50,000 Yuan RMB for B". The word "top-up" is the original index information in the original index information set. Therefore, the matching result indicates that the matching succeeds. The information content 1 is a sensitive transaction. Information content 2 is "A transfers 100 Yuan RMB to C". The information does not include the original index information in the original index information set. Therefore, the information content 2 is a secure transaction.

104: Determine a variant index information set when the matching result indicates that the matching succeeds, the variant index information set comprising at least one piece of variant index information, the variant index information comprising the information index corresponding to the information content in the information.

In this embodiment, the information processing apparatus determines a variant index information set based on the matching result of the transaction information when the matching result indicates that the matching succeeds, the variant index information set including at least one piece of variant index information, the variant index information including information index in the information. Table 2 is an example of the variant index information set.

TABLE 2

| Column name | Data type | Description |
| --- | --- | --- |
| Hash value | String | Hash value of original index information in a transaction |
| Sensitivity level | Int8 | Sensitivity level:<br>1: Common sensitivity<br>2: Intermediate sensitivity<br>3: High sensitivity |
| Block height | Int64 | Block height of original index information in a block |
| Intra-block index | Int16 | Index of original index information in a block |

As shown in Table 2, the hash value represents a hash value corresponding to the original index information in information content. The sensitivity level represents a sensitivity degree of the original index information. Original index information of different levels may be processed differently. The block height represents a block height of the original index information in a block. The intra-block index represents information of the original index information in a block. The data type corresponding to the hash value is String. The data type corresponding to the sensitivity level is Int8. The data type corresponding to the block height is Int64. The data type corresponding to the intra-block index is Int16. It may be understood that Table 2 is merely an example, but is not to be understood as a limitation to the variant index information set.

In the embodiments of this application, a blockchain-based information processing method is provided. First, an original index information set is obtained, the original index information set including at least one piece of original index information, each piece of original index information including plaintext sensitive content; and information in a to-be-matched block is then obtained, the information including information content and an information index, the information content having a correspondence with the information index; and the information content in the information is matched by using the original index information set, to obtain a matching result, and a variant index information set is determines according to the matching result when the matching result indicates that the matching succeeds, the variant index information set including at least one piece of variant index information, the variant index information including the information index corresponding to the information content in the information. Through the foregoing methods, a record of index information is no longer maintained in plaintext, but an information index of the index information involved during a blockchain transaction is recorded, thereby forming variant index information. The variant index information does not directly display specific content of the index information, but is maintained in the form of the information index, so that potential security hazards are less likely to occur, and the security of information maintenance is improved.

In some embodiments, based on the embodiment corresponding to FIG. 3, in an optional embodiment of a blockchain-based information processing method provided by the embodiments of this application, the matching the information content in the information by using the original index information set includes:

matching first information content by using the original index information set, the first information content being part of the information; and matching information content in a second block in a case that the first information content is the last piece of information in a first block, the first block being a block of the to-be-matched blocks, the second block being another block of the to-be-matched blocks, the second block being a next block adjacent to the first block; or obtaining second information content in a first block in a case that the first information content is not the last piece of information in the first block, and matching the second information content by using the original index information set, the second information content being a next piece of information content adjacent to the first information content.

In this embodiment, a method for matching the information content in the transaction information by using the original index information set is described. Specifically, first, the first information content in the first block is matched. In a case that the first information content is the last piece of information in the first block, first information content in the second block is obtained for matching, the second block being a next block of the first block. In a case that the first information content is not the last piece of information in the first block, the second information content in the first block is obtained, and the second information content is matched by using the original index information set, until the matching of information content corresponding to each piece of information in each block is completed.

Figure 4:
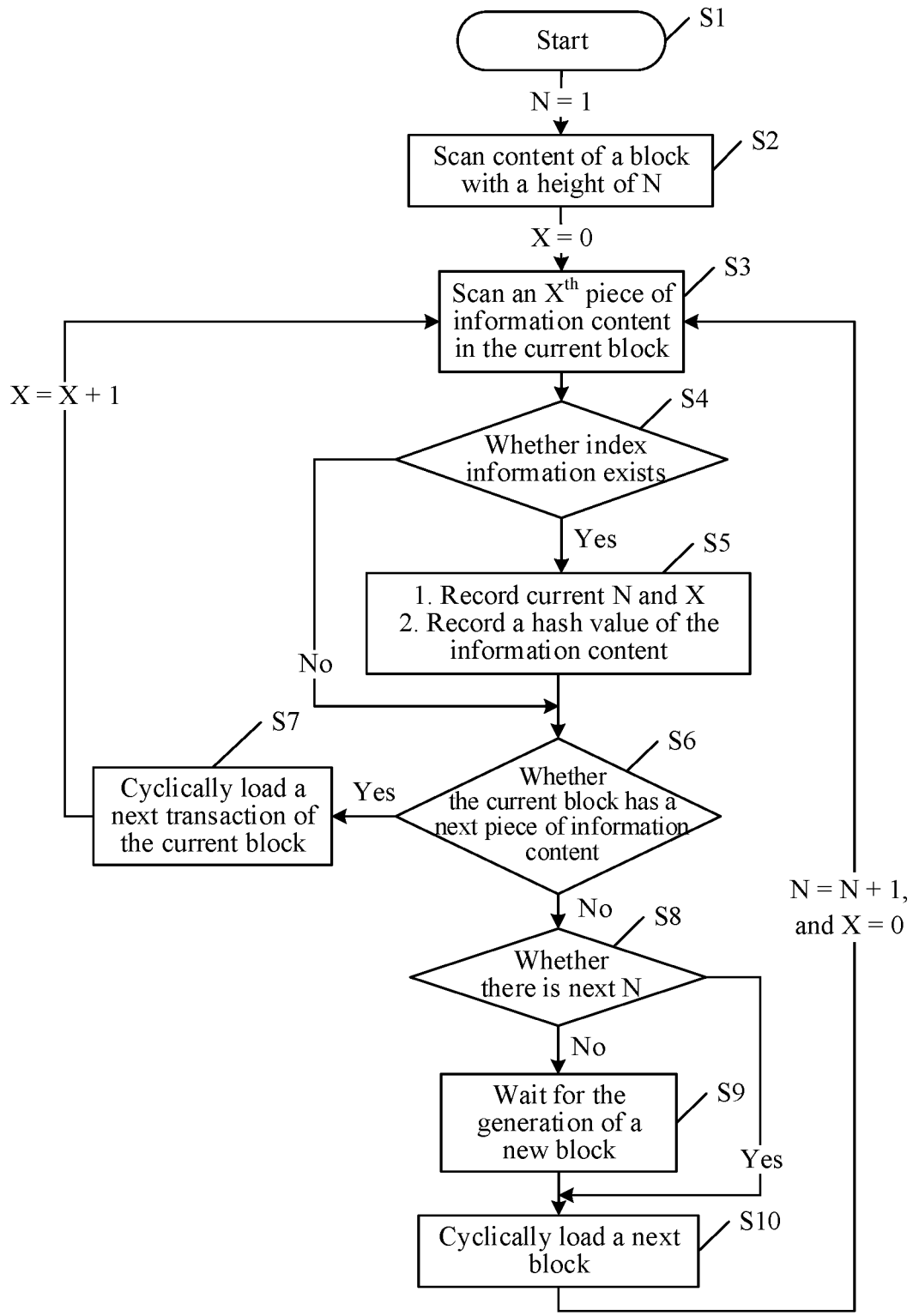
FIG. 4 is a schematic flowchart of updating a variant index information set according to an embodiment of this application.

For ease of description, FIG. 4 is a schematic flowchart of updating a variant index information set according to an embodiment of this application. As shown in the figure:

Step S1: Start to match original index information.

Step S2: Represent a block height by N, a block including X pieces of information content, initialize N is to 1, and initialize X to 0.

Step S3: Scan an $X^{th}$ piece of information content in the information content of the current block.

Step S4: Determine whether original index information exists in the $X^{th}$ piece of information content, for example, whether a sensitive word exists, where step S5 is performed in a case that original index information exists, and step S6 is performed in a case that no original index information exists.

Step S5: Record N and X in a case that original index information exists in the $X^{th}$ piece of information content, where a hash value corresponding to the $X^{th}$ piece of information content may further be recorded. That is, N is added to a block height field of the variant index information set, X is added to an intra-block index field, and the hash value is added to a hash value field.

Step S6: Continue to determine, in a case that no original index information exists in the $X^{th}$ piece of information content, whether the current block has a next piece of information content, where step S7 is performed in a case that the block has a next piece of information content, or step S8 is performed in a case that the block does not have a next piece of information content.

Step S7: Continue to load a next piece of information content of the block in a case that the next piece of information content exists in the block with the height of N, that is, add 1 to X, that is X=X+1, where step S3 to step S6 are then performed again.

Step S8: Determine, in a case that a next piece of information content does not exist in the block with the height of N, whether there is a block corresponding to a next block height, that is, detect whether there is next N, where if next N exists, step S10 is performed, or if next N does not exist, step S9 is performed.

Step S9: Continue to wait for the generation of a new block in a case that a block corresponding to the next block height does not exist.

Step S10: Cyclically load a block corresponding to the next block height in a case that the block corresponding to the next block height exists, and change both N and X, that is, N=N+1, and X=0.

Second, in an embodiment of this application, a method for matching transaction information by using an original index information set is provided. That is, the first information content is matched by using the original index information set. The information content in the second block is matched in a case that the first information content is the last piece of transaction information in the first block, the second information content in the first block is obtained and the second information content is matched by using the original index information set in a case that the first information content is not the last piece of transaction information in the first block. Through the foregoing method, during actual matching, each piece of information content in each block is matched, thereby achieving a full scan of the block, to facilitate the generation of a more complete variant index information set.

In some embodiments, based on the embodiment corresponding to FIG. 3, in an optional embodiment of a blockchain-based information processing method provided by the embodiments of this application, the determining a variant index information set may include:

obtaining a sensitivity level of the original index information in a case that the matching result is that the information successfully matches the original index information in the original index information set;

obtaining a hash value, an intra-block index, and a block height in the information index, the intra-block index representing a position of the information in the to-be-matched block; and generating the variant index information set according to the sensitivity level, the hash value, the intra-block index, and the block height of the original index information.

In this embodiment, representation forms of three types of variant index information sets are described. A sensitivity level of the original index information is obtained in a case that the matching result is that the information content in the information successfully matches the original index information in the original index information set. Specifically, one piece of information content is used as an example. It is assumed that information content A matches a piece of original index information A in the original index information set, the sensitivity level of the original index information A is obtained. In addition, a hash value and an intra-block index of the information content A may further be obtained. It is assumed that the information content A is a block M, and a block height of the block M may then be obtained. According to the foregoing information, Table 3 is an example of the variant index information set.

TABLE 3

| Column name | Data type | Description |
| --- | --- | --- |
| Hash value | String | Hash value of original index information in a transaction |
| Sensitivity level | Int8 | Sensitivity level:<br>1: Common sensitivity<br>2: Intermediate sensitivity<br>3: High sensitivity |
| Block height | Int64 | Block height of original index information in a block |
| Intra-block index | Int16 | Index of original index information in a block |

As can be seen in Table 3, the variant index information set may include the sensitivity level, the hash value, the intra-block index, and the block height of the original index information.

Table 4 is another example of the variant index information set.

TABLE 4

| Column name | Data type | Description |
| --- | --- | --- |
| Hash value | String | Hash value of original index information in a transaction |
| Sensitivity level | Int8 | Sensitivity level:<br>1: Common sensitivity<br>2: Intermediate sensitivity<br>3: High sensitivity |

As can be seen in Table 4, the variant index information set may include the sensitivity level and the hash value of the original index information.

Table 5 is another example of the variant index information set.

TABLE 5

| Column name | Data type | Description |
| --- | --- | --- |
| Sensitivity level | Int8 | Sensitivity level:<br>1: Common sensitivity<br>2: Intermediate sensitivity<br>3: High sensitivity |
| Block height | Int64 | Block height of original index information in a block |
| Intra-block index | Int16 | Index of original index information in a block |

As can be seen in Table 5, the variant index information set may include the sensitivity level, the intra-block index, and the block height of the original index information, and the variant index information set is determined.

Second, in an embodiment of this application, a manner of determining a variant index information set is provided. The sensitivity level of the original index information is obtained in a case that the matching result is that the information content successfully matches the original index information in the original index information set, and the hash value, the intra-block index, and the block height in an information index may then be obtained. The intra-block index represents a position of the information content in the to-be-matched block. Finally, the variant index information set may be generated according to the sensitivity level, the hash value, the intra-block index, and the block height of the original index information. Alternatively, the variant index information set is generated according to the sensitivity level and the hash value of the original index information. Alternatively, the variant index information set is generated according to the sensitivity level, the intra-block index, and the block height of the original index information. In the foregoing manner, the generated variant index information set may include different information. Three types of usable variant index information sets are listed herein, and information may be matched according to an actual requirement, thereby improving the flexibility and applicability of the solution.

In some embodiments, based on the embodiment corresponding to FIG. 3, the third optional embodiment of a blockchain-based information processing method provided by the embodiments of this application, after the determining the variant index information set, further includes:

receiving request information from a client, the request information carrying a to-be-detected information index;

detecting the to-be-detected information index by using the variant index information set, to obtain a detection result; and processing the request information according to the detection result.

In this embodiment, an application method of a variant index information set is described. When a user requests to display information, the request information may be transmitted by using a client, and the information processing apparatus receives the request information. The request information carries the to-be-detected information index, and the to-be-detected information index is the content of an original request. The information processing apparatus detects the to-be-detected information index and the variant index information in the variant index information set, to obtain the detection result. Finally, a processing manner of the request information is selected according to the detection result.

Further, in an embodiment of this application, an application method of a variant index information set is provided. After the variant index information set is generated, the request information transmitted by the client may further be received, and the to-be-detected information index is then detected by using the variant index information set, to obtain the detection result, and finally, the request information is processed according to the detection result. In the foregoing manner, an information index is detected by using the variant index information set, so that the risk brought to a blockchain application by security supervision on blockchain content can be effectively resolved, and the information index is transmitted to providers of blockchain services, thereby avoiding potential security hazards brought by direct transmission of original index information.

In some embodiments, based on the embodiment corresponding to FIG. 3, in an optional embodiment of a blockchain-based information processing method provided by the embodiments of this application, the detecting the to-be-detected information index by using the variant index information set, to obtain a detection result includes:

determining a target hash value according to the to-be-detected information index;

matching the target hash value by using the variant index information set;

determining, when the target hash value successfully matches the variant index information in the variant index information set, that information content corresponding to the to-be-detected information index is sensitive information; and determining, when the target hash value fails to match the variant index information in the variant index information set, that information content corresponding to the to-be-detected information index is secure information.

Figure 5:
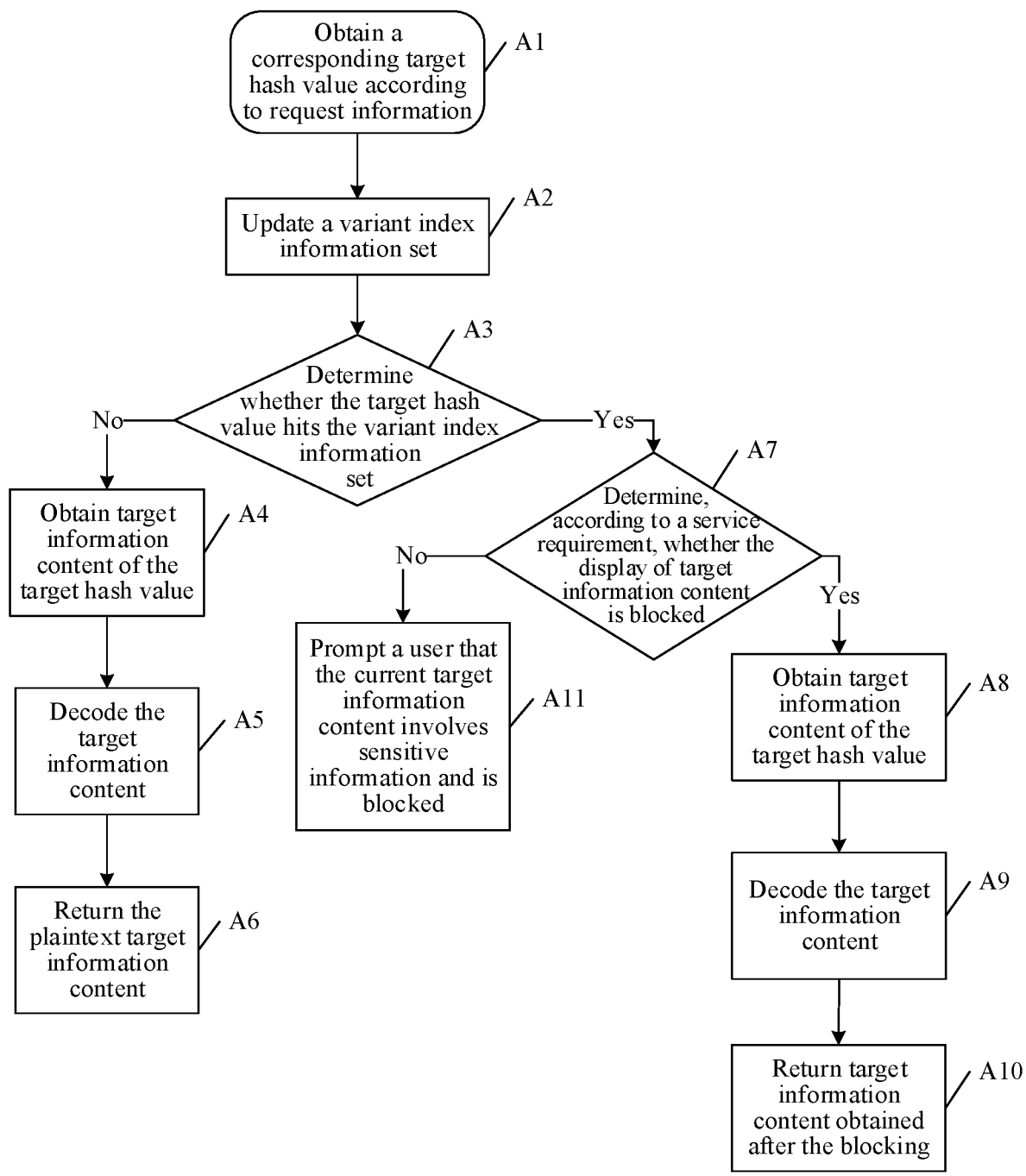
FIG. 5 is a schematic flowchart of applying a variant index information set according to an embodiment of this application.

In this embodiment, a manner of detecting the to-be-detected information index is described. For ease of description, the description is made with reference to FIG. 5 below. FIG. 5 is a schematic flowchart of applying a variant index information set according to an embodiment of this application. Specifically:

Step A1: First, obtain request information initiated by a user, determine a corresponding to-be-detected information index according to the request information, and obtain a corresponding target hash value according to the to-be-detected information index.

Step A2: Obtain an updated variant index information set, where because a quantity of blocks changes, the variant index information set is usually updated in real time.

Step A3: Match the target hash value by using the variant index information set, that is, determine whether the target hash value hits a hash value in the variant index information set, where the process starts with step A4 in a case that the matching fails, or the process starts with step A7 in a case that the matching succeeds.

Step A4: Determine, when the target hash value fails to match the variant index information in the variant index information set, that the to-be-detected information index is secure information, where in this case, target information content corresponding to the target hash value may be obtained from another block.

Step A5: Decode the target information content, where the target information content may be serialized data in the form of a bit group, and after the target information content is decoded, structural data readable by naked eyes may be obtained, that is, plaintext target information content is obtained.

Step A6: Return the plaintext target information content to a client, to enable the client to display the target information content.

Step A7: Determine, when the target hash value successfully matches the variant index information in the variant index information set, that the to-be-detected information index is sensitive information, where in this case, it needs to be determined, according to a service requirement, whether the display of target information content needs to be completely blocked, and step A11 is performed in a case that the target information content needs to be completely blocked, or step A8 is performed in a case that the target information content does not need to be completely blocked.

Step A8: Obtain the target information content corresponding to the target hash value in another block in a case that the target information content does not need to be completely blocked.

Step A9: Decode the target information content, where the target information content may be serialized data in the form of a bit group, and after the target information content is decoded, structural data readable by naked eyes may be obtained, that is, plaintext target information content is obtained.

Step A10: Match the plaintext target information content by using the original index information set, to obtain corresponding target index information, block the target index information in the target information content, and then return the target information content to the client after the target index information is blocked, to enable the client to display the target information content.

Step A11: Directly prompt, in a case that the target information content needs to be completely blocked, the user that the current target information content involves sensitive content, so that the target information content is blocked.

Further, an embodiment of this application provides a method for detecting a to-be-detected information index by using a variant index information set to obtain a detection result. First, the target hash value is determined according to the to-be-detected information index, and the target hash value is then matched by using the variant index information set. It is determined, when the target hash value successfully matches the variant index information in the variant index information set, the to-be-detected information index is sensitive transaction information, and it is determined, when the target hash value fails to match the variant index information in the variant index information set, that the to-be-detected information index is secure transaction information. In the foregoing manner, when a user requests to browse a designated transaction, a to-be-queried hash value submitted by the user is matched against the variant index information set. Corresponding blocking is performed in a case that the hash value hits the variant index information set, and the transaction information that the user wants to browse is displayed in plaintext in a case that the hash value does not hit the variant index information set, thereby improving the security of the public transaction information.

In some embodiments, based on the embodiment corresponding to FIG. 3, in an optional embodiment of a blockchain-based information processing method provided by the embodiments of this application, the detecting the to-be-detected information index by using the variant index information set, to obtain a detection result includes:

determining a target intra-block index and a target block height according to the to-be-detected information index;

matching the target intra-block index and the target block height by using the variant index information set;

determining, when the target intra-block index and the target block height successfully match the variant index information in the variant index information set, that the to-be-detected information index is sensitive transaction information; and determining, when the target intra-block index and the target block height fail to match the variant index information in the variant index information set, that information content corresponding to the to-be-detected information index is secure information.

Figure 6:
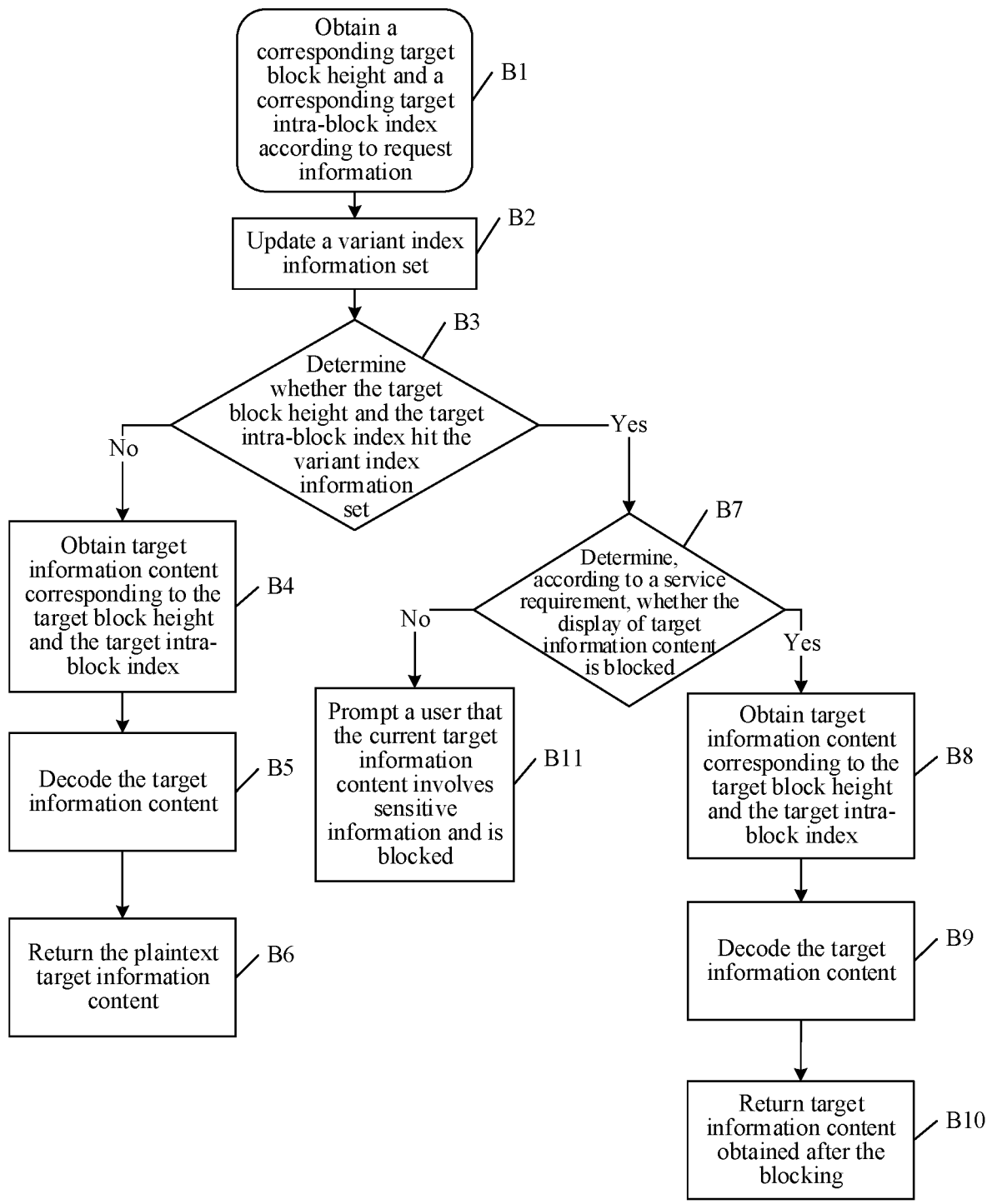
FIG. 6 is a schematic flowchart of applying a variant index information set according to an embodiment of this application.

In this embodiment, another manner of detecting the to-be-detected information index is described. For ease of description, the description is made with reference to FIG. 6. FIG. 6 is a schematic flowchart of applying a variant index information set according to an embodiment of this application. Specifically:

Step B1: First, obtain request information initiated by a user, determine a corresponding to-be-detected information index according to the request information, and obtain a corresponding target block height and a corresponding target intra-block index according to the to-be-detected information index.

Step B2: Obtain an updated variant index information set, where because a quantity of blocks changes, the variant index information set is usually updated in real time.

Step B3: Match the target block height against the target intra-block index by using the variant index information set, that is, determine whether the target block height and the target intra-block index hit both a block height and an intra-block index of the variant index information set, where the process starts with step B4 in a case that the matching fails, or the process starts with step B7 in a case that the matching succeeds.

Step B4: Determine, in a case that the target block height and the target intra-block index fail to match variant index information in the variant index information set, that the to-be-detected information index is secure transaction information, where in this case, target information content corresponding to the target block height and the target intra-block index may be obtained from another block.

Step B5: Decode the target information content, where the target information content may be serialized data in the form of a bit group, and after the target information content is decoded, structural data readable by naked eyes may be obtained, that is, plaintext target information content is obtained.

Step B6: Return the plaintext target information content to a client, to enable the client to display the target information content.

Step B7: Determine, in a case that the target block height and the target intra-block index successfully match variant index information in the variant index information set, that the to-be-detected information index is sensitive information, where in this case, it needs to be determined, according to a service requirement, whether the display of target information content needs to be completely blocked, and step B11 is performed in a case that the target information content needs to be completely blocked, or step B8 is performed in a case that the target information content does not need to be completely blocked.

Step B8: Obtain the target information content corresponding to the target block height and the target intra-block index in another block in a case that the target information content does not need to be completely blocked.

Step B9: Decode the target information content, where the target information content may be serialized data in the form of a bit group, and after the target information content is decoded, structural data readable by naked eyes may be obtained, that is, plaintext target information content is obtained.

Step B10: Match the plaintext target information content by using the original index information set, to obtain corresponding target index information, block the target index information in the target information content, and then return the target information content to the client after the target index information is blocked, to enable the client to display the target information content.

Step B11: Directly prompt, in a case that the target information content needs to be completely blocked, the user that the current target information content involves sensitive content, so that the target information content is blocked.

Further, an embodiment of this application provides a method for detecting a to-be-detected information index by using a variant index information set to obtain a detection result. First, the target intra-block index and the target block height are determined according to the to-be-detected information index, and the target intra-block index and the target block height are then matched by using the variant index information set. It is determined, when the target intra-block index and the target block height successfully match the variant index information in the variant index information set, that information corresponding to the to-be-detected information index is sensitive information, and it is determined, when the target intra-block index and the target block height fail to match the variant index information in the variant index information set, that the information corresponding to the to-be-detected information index is secure information. In the foregoing manner, when a user requests to browse a designated transaction, a to-be-queried intra-block index and a to-be-queried block height that are submitted by the user are matched against the variant index information set. Corresponding blocking is performed in a case that the intra-block index and the block height hit the variant index information set, and the information that the user wants to browse is displayed in plaintext in a case that the intra-block index and the block height fail to hit the variant index information set, thereby improving the security of public information.

In some embodiments, based on any of the third embodiment to the fifth embodiment corresponding to FIG. 3, in an optional embodiment of a blockchain-based information processing method provided by the embodiments of this application, the processing the request information according to the detection result may include:

obtaining target information content according to the to-be-detected information index when information content corresponding to the to-be-detected information index is secure information; and transmitting the target information content to a client, to enable the client to display the target information content.

In this embodiment, based on step A4, step A5, and step A6 in FIG. 5, and step B4, step B5, and step B6 in FIG. 6, when it is determined that the information content corresponding to the to-be-detected information index is the secure information, the target information content corresponding to the to-be-detected information index is obtained according to the request information, that is, the target information content is obtained from another block, the target information content is directly transmitted to the client after decoding, and the target information content is displayed by the client in plaintext.

Further, in an embodiment of this application, a method for processing target information content corresponding to a to-be-detected information index according to a detection result is provided. In a case that the to-be-detected information index is secure transaction information, the target information content is obtained according to the to-be-detected information index, and the target information content is transmitted to the client, to enable the client to display the target information content. In the foregoing manner, for information corresponding to a secure information index, complete information content may be displayed on the client in plaintext, to provide a user with more complete information while ensuring security, thereby improving the reliability and feasibility of the solution.

In some embodiments, based on any of the embodiments corresponding to FIG. 3, in an optional embodiment of a blockchain-based information processing method provided by the embodiments of this application, the processing the request information according to the detection result may include:

determining a target sensitivity level and a target service type according to the to-be-detected information index when information content corresponding to the to-be-detected information index is sensitive information;

determining, according to the target sensitivity level and the target service type, whether to display target information content corresponding to the to-be-detected information index; and transmitting prompt information to the client in a case of determining not to display the target information content, to enable the client to display the prompt information, the prompt information being used for prompting a user that the target information content is the sensitive information; and processing the target information content in a case of determining to display the target information content, to obtain the processed target information content.

In this embodiment, a manner of processing target information content corresponding to a to-be-detected information index according to a detection result is described. A target sensitivity level and a target service type are determined according to the to-be-detected information index when information content corresponding to the to-be-detected information index is sensitive information, and different service requirements usually correspond to different sensitivity levels and service types. Therefore, it is determined, according to the target sensitivity level and the target service type, whether to display the target information content corresponding to the request information. Prompt information is transmitted to the client, for example, "The current transaction information involves sensitive content and is not displayed" in a case that the target information content is not displayed, thereby prompting the user that the target information content is the sensitive transaction information. The target information content is processed in a case that the target information content needs to be displayed, to obtain the processed target information content. That is, target index information in the target information content is blocked, to obtain processed transaction information.

Specifically, different services may have different requirements on sensitivity levels and service types. Table 6 is an example of correspondences between different service requirements and sensitivity levels and service types.

TABLE 6

| Service requirement | Sensitivity level | Service type | Display status |
|---|---|---|---|
| A | Common sensitivity | Electronic contract service | Transaction information is partially displayed |
| B | High sensitivity | Electronic contract service | Transaction information is not displayed |
| C | High sensitivity | Bill service | Transaction information is not displayed |
| D | High sensitivity | Bitcoin service | Transaction information is not displayed |
| E | Intermediate sensitivity | Electronic contract service | Transaction information is partially displayed |

It may be known from Table 6 that, for the service A, a target sensitivity level is common sensitivity, and a target service type is an electronic contract service. In this case, only target index information in target information content needs to be blocked. For the service B, a target sensitivity level is high sensitivity, and a target service type is an electronic contract service. In this case, complete target information content needs to be blocked.

Further, in an embodiment of this application, a method for processing target information content according to a detection result is provided. In a case that the information content corresponding to the to-be-detected information index is the sensitive information, the target sensitivity level and the target service type are determined according to the to-be-detected information index, and it is then determined, according to the target sensitivity level and the target service type, whether to display the target information content corresponding to the to-be-detected information index. The prompt information is transmitted to the client in a case that the target information content is not displayed, to enable the client to display the prompt information, and the target information content is processed in a case that the target information content is displayed, to obtain the processed target information content. In the foregoing manner, it may further be selected, according to a specific service requirement, whether to completely block the sensitive information, thereby improving the flexibility of information processing.

In some embodiments, in an optional embodiment of a blockchain-based information processing method provided by the embodiments of this application, the processing the target information content, to obtain processed target information content may include:

obtaining the target information content;

matching the target information content by using the original index information set, and determining target index information in the target information content; and blocking the target index information in the target information content, to obtain the processed target information content.

In this embodiment, a manner of processing target information content is described. First, target information content corresponding to a designated hash value is obtained from another block according to the request information. Different from the to-be-detected information index, the target information content is a user-definable field, while the to-be-detected information index is information generated by a system.

After the target information content is obtained, it is assumed that the target information content is "A asks B for an ID card number information", and the target information content is matched by using an original index information set. It is determined that target index information in the target information content is "ID card number". Therefore, the target index information is blocked, to obtain processed transaction information, for example, "A asks B for information about . . . ". An information processing apparatus transmits the processed transaction information to the client, and in this case, the client displays "A asks B for information about . . . ".

Further, in an embodiment of this application, a method for processing target information content is provided. That is, the target information content is obtained, the target information content is then matched by using the original index information set, the target index information in the target information content is determined, the target index information in the target information content is then blocked, to obtain the processed transaction information, and finally, the processed transaction information is transmitted to the client, to enable the client to display the processed transaction information. In the foregoing manner, only partial index information may be blocked, thereby improving the security of the information. Meanwhile, the partial display of non-index information helps a user to obtain partial information, thereby improving the feasibility of the solution.

Figure 7:
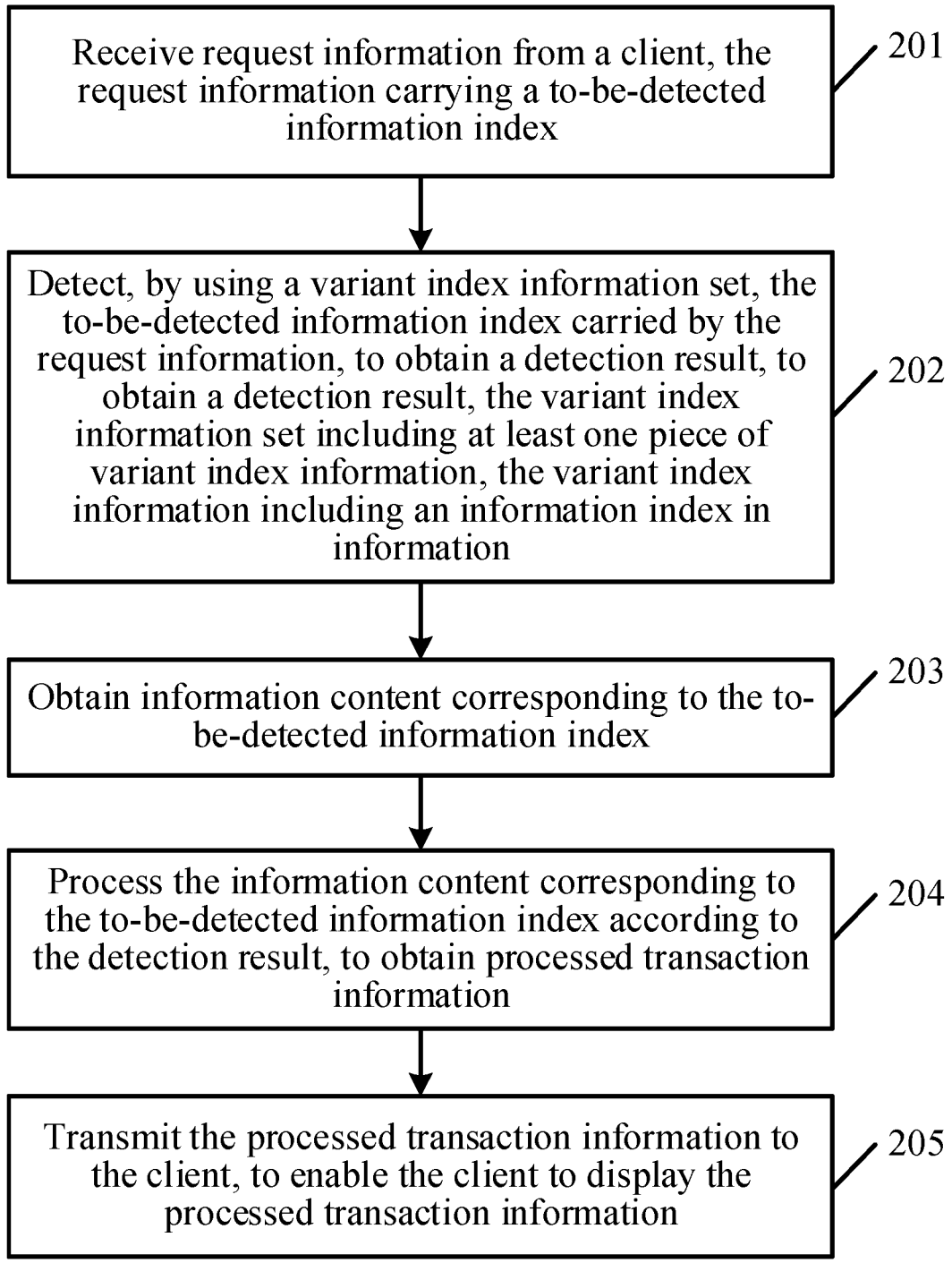
FIG. 7 is a schematic diagram of an embodiment of a blockchain-based information processing method according to an embodiment of this application.

The following describes a blockchain-based information processing method in this application with reference to the foregoing description. The blockchain-based information processing method may be performed by a blockchain-based data processing apparatus, and the blockchain-based data processing apparatus is disposed in a network node device. Referring to FIG. 7, an embodiment of the blockchain-based information processing method in the embodiments of this application includes the following steps:

201: Receive request information from a client, the request information carrying a to-be-detected information index.

In this embodiment, when a user requests to display information related to a transaction, the request information may be transmitted through a client, and an information processing apparatus receives the request information. The request information carries the to-be-detected information index, and the to-be-detected information index is the content of an original request.

202: Detect, by using a variant index information set, the to-be-detected information index carried by the request information, to obtain a detection result, to obtain a detection result, the variant index information set including at least one piece of variant index information, the variant index information including an information index in information.

In this embodiment, the information processing apparatus detects the to-be-detected information index and the variant index information in the variant index information set, to obtain the detection result. It may be understood that for a manner of detecting the to-be-detected information index in a transaction request, reference may be made to the embodiment corresponding to FIG. 3, and details are not described herein. The variant index information set includes at least one piece of variant index information, and the variant index information is the form of the index. Referring to Table 3, Table 4, and Table 5 for details, a generation manner of the variant index information set is shown in the embodiment corresponding to FIG. 3, and details are not described herein.

In an example, the foregoing step 202 may include the following sub-steps:

1: Determine a target hash value according to the to-be-detected information index.

2: Match the target hash value by using the variant index information set.

3: Determine, when the target hash value successfully matches the variant index information in the variant index information set, that information content corresponding to the to-be-detected information index is sensitive information.

4: Determine, when the target hash value fails to match the variant index information in the variant index information set, that information content corresponding to the to-be-detected information index is secure information.

In another embodiment, the foregoing step 202 may include the following sub-steps:

1: Determine a target intra-block index and a target block height according to the to-be-detected information index.

2: Match the target intra-block index and the target block height by using the variant index information set;

3: Determine, when the target intra-block index and the target block height successfully match the variant index information in the variant index information set, that the information content corresponding to the to-be-detected information index is sensitive transaction information.

4: Determine, when the target intra-block index and the target block height fail to match the variant index information in the variant index information set, that information content corresponding to the to-be-detected information index is secure information.

203: Obtain information content corresponding to the to-be-detected information index;

In this embodiment, the information processing apparatus obtains information content corresponding to the to-be-detected information index, and specifically, the corresponding information content may be obtained from another block.

204: Process the information content corresponding to the to-be-detected information index according to the detection result, to obtain processed information; and In this embodiment, the information processing apparatus processes the information content according to the detection result. The information content is directly displayed in plaintext in a case that the to-be-detected information index indicates that the information content is secure. In a case that the to-be-detected information index indicates that the information content is not secure, according to a service requirement, the information content may be completely blocked to obtain processed transaction information, or the information content is partially blocked, to obtain the processed transaction information.

In some embodiments, the foregoing step 204 includes the following several sub-steps:

1: Determine a target sensitivity level and a target service type according to the to-be-detected information index when information content corresponding to the to-be-detected information index is sensitive information.

2: Determine, according to the target sensitivity level and the target service type, whether to display target information content corresponding to the to-be-detected information index.

3: Process the target information content in a case of determining to display the target information content, to obtain the processed information.

205: Transmit the processed transaction information to the client, to enable the client to display the processed transaction information.

Figure 8:
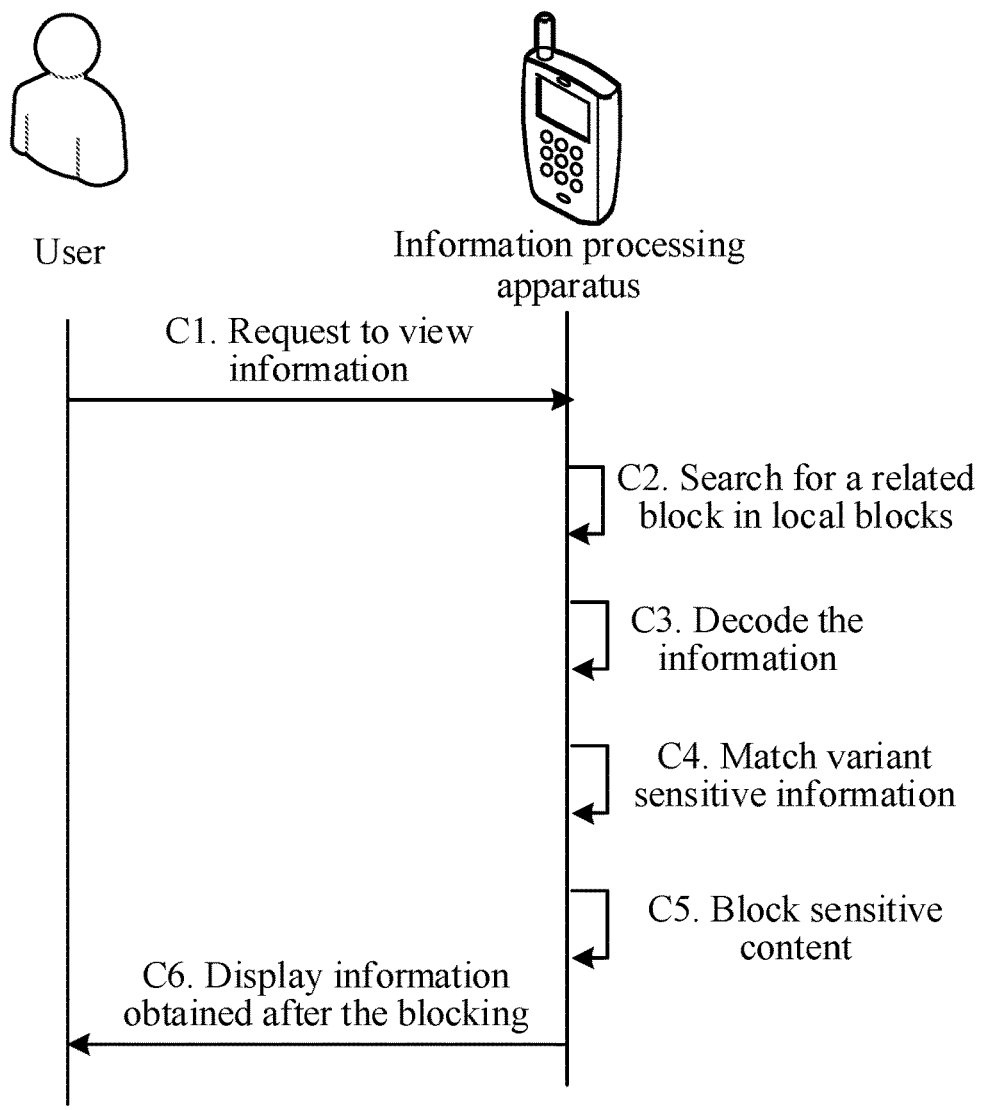
FIG. 8 is a schematic flowchart of displaying processed transaction information by a client according to an embodiment of this application.

In this embodiment, the information processing apparatus may be disposed in the client or may be disposed outside the client. The information processing apparatus transmits the processed transaction information to the client, to enable the client to display the processed transaction information. The client may be specifically a blockchain browser. For ease of description, FIG. 8 is a schematic flowchart of displaying processed transaction information by a client according to an embodiment of this application. The information processing apparatus in FIG. 8 is disposed in the client, as shown in the figure, specifically:

Step C1: A user triggers, by using a client, a request, that is, a request for viewing information related to a transaction.

Step C2: An information processing apparatus searches for another related block by using a local block.

Step C3: The information processing apparatus decodes block information on the related block according to the request initiated by the user, to obtain transaction information.

Step C4: The information processing apparatus matches the transaction information against variant index information in a variant index information set.

Step C5: Block sensitive content, for example, a sensitive word or a sensitive character, in the information in a case that the sensitive content exists in the information.

Step C6: The information processing apparatus displays, to the user, information obtained after the blocking.

In some embodiments, the foregoing method may further include the following several steps:

1: Obtain an original index information set, the original index information set including at least one piece of original index information, each piece of original index information including plaintext sensitive content.

2: Obtain information in to-be-matched blocks in a blockchain system, the information including information content and an information index, the information content having a correspondence with the information index.

3: Match the information content in the information by using the original index information set, to obtain a matching result.

4: Determine a variant index information set when the matching result indicates that the matching succeeds, the variant index information set comprising at least one piece of variant index information, the variant index information comprising the information index corresponding to the information content in the information.

In some embodiments, the step includes the following several sub-steps:

4.1: Obtain a sensitivity level of the original index information in a case that the matching result is that the information successfully matches the original index information in the original index information set.

4.2: Obtain a hash value, an intra-block index, and a block height in the information index, the intra-block index representing a position of the information in the to-be-matched block.

4.3: Generate the variant index information set according to the sensitivity level, the hash value, the intra-block index, and the block height of the original index information.

For an obtaining process of the detection result, an obtaining procedure of the processed information, and a generation manner of the variant index information set, refer may be made to the foregoing embodiments, and details are not described herein.

In an embodiment of this application, a blockchain-based information processing method is provided. First, a transaction request transmitted by a client is received, and a to-be-detected information index carried by the transaction request is then detected by using a variant index information set, to obtain a detection result, target information content corresponding to the to-be-detected information index is obtained, finally, the target information content is processed according to the detection result, to obtain processed transaction information, and the processed transaction information is transmitted to the client, to enable the client to display the processed transaction information. In the foregoing manner, the transaction information is detected by using the variant index information set, so that the risk brought to a blockchain application by security supervision on blockchain content can be effectively resolved, and index information is transmitted to providers of blockchain services, thereby avoiding potential security hazards brought by direct transmission of the original index information set. In addition, the transaction may further be processed, to obtain the processed transaction information, and the transmission of the processed transaction information can further improve the security of the solution.

In some embodiments, an embodiment of this application provides a blockchain-based information processing method. The method includes the following steps:

First: Receive request information from a client, the request information carrying a to-be-detected information index.

Second: Determine a target intra-block index and a target block height according to the to-be-detected information index.

Third: Match the target intra-block index and the target block height by using a variant index information set, the variant index information set including at least one piece of variant index information, the variant index information including an information index corresponding to information content in information.

Fourth: Determine, when the target intra-block index and the target block height successfully match the variant index information in the variant index information set, that the information content corresponding to the to-be-detected information index is sensitive transaction information;

Fifth: Determine, when the target intra-block index and the target block height fail to match the variant index information in the variant index information set, that information content corresponding to the to-be-detected information index is secure information; and Sixth: Process the request information according to the detection result.

For descriptions of the foregoing steps, reference may be made to the embodiments above, and details are not described herein.

Figure 9:
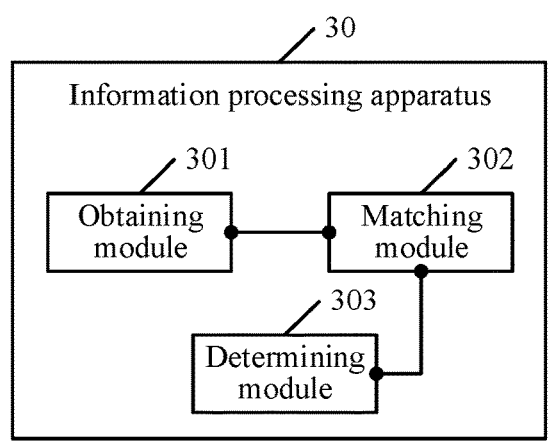
FIG. 9 is a schematic diagram of an embodiment of a blockchain-based information processing apparatus according to an embodiment of this application.

A blockchain-based information processing apparatus of this application is described below in detail. FIG. 9 is a schematic diagram of an embodiment of a blockchain-based information processing apparatus according to an embodiment of this application. The information processing apparatus 30 includes:

an obtaining module 301, configured to obtain an original index information set, the original index information set including at least one piece of original index information, each piece of original index information including plaintext sensitive content, the obtaining module 301 being further configured to obtain information in a to-be-matched block, the information including information content and an information index, the information content having a correspondence with the information index;

a matching module 302, configured to match the information content in the information by using the original index information set obtained by the obtaining module 301, to obtain a matching result; and a determining module 303, configured to determine a variant index information set when the matching result indicates that the matching succeeds, the variant index information set comprising at least one piece of variant index information, the variant index information comprising the information index corresponding to the information content in the information.

In this embodiment, the obtaining module 301 obtains an original index information set, the original index information set including at least one piece of original index information, each piece of original index information including plaintext sensitive content; the obtaining module 301 obtains information in a to-be-matched block, the information including information content and an information index, the information content having a correspondence with the information index, the matching module 302 matches the information content in the information by using the original index information set obtained by the obtaining module 301, to obtain a matching result, and the determining module 303 determines a variant index information set when the matching result indicates that the matching succeeds, the variant index information set comprising at least one piece of variant index information, the variant index information comprising the information index corresponding to the information content in the information.

In the embodiments of this application, a blockchain-based information processing apparatus is provided. First, an original index information set is obtained, the original index information set including at least one piece of original index information, each piece of original index information including plaintext sensitive content; and information in a to-be-matched block is then obtained, the information including information content and an information index, the information content having a correspondence with the information index; and the information content in the information is matched by using the original index information set, to obtain a matching result, and a variant index information set is generated according to the matching result when the matching result indicates that the matching succeeds, the variant index information set including at least one piece of variant index information, the variant index information including the information index corresponding to the information content in the information. Through the foregoing methods, a record of index information is no longer maintained in plaintext, but an information index of the index information involved during a blockchain transaction is recorded, thereby forming variant index information. The variant index information does not directly display specific content of the index information, but is maintained in the form of the information index, so that potential security hazards are less likely to occur, and the security of information maintenance is improved.

In some embodiments, based on the embodiment corresponding to FIG. 9, in another embodiment of the information processing apparatus 30 provided in the embodiments of this application, the matching module 302 is specifically configured to: match first information content by using the original index information set, the first information content being part of the information; and match information content in a second block in a case that the first information content is the last piece of information in a first block, the first block being a block of the to-be-matched blocks, the second block being another block of the to-be-matched blocks, the second block being a next block adjacent to the first block; or obtain second information content in a first block in a case that the first information content is not the last piece of information in the first block, and match the second information content by using the original index information set, the second information content being a next piece of information content adjacent to the first information content.

Second, in an embodiment of this application, a method for matching transaction information by using an original index information set is provided. That is, the first information content is matched by using the original index information set. The information content in the second block is matched in a case that the first information content is the last piece of transaction information in the first block, the second information content in the first block is obtained and the second information content is matched by using the original index information set in a case that the first information content is not the last piece of transaction information in the first block. Through the foregoing method, during actual matching, each piece of information content in each block is matched, thereby achieving a full scan of the block, to facilitate the generation of a more complete variant index information set.

In some embodiments, based on the embodiment corresponding to FIG. 9, in another embodiment of the information processing apparatus 30 provided in the embodiments of this application, the determining module 303 is specifically configured to: obtain a sensitivity level of the original index information when the matching result indicates that the information successfully matches the original index information in the original index information set;

obtain a hash value, an intra-block index, and a block height in the information index, the intra-block index representing a position of the information in the to-be-matched block; and generate the variant index information set according to the sensitivity level, the hash value, the intra-block index, and the block height of the original index information.

Second, in an embodiment of this application, a manner of determining a variant index information set is provided. The sensitivity level of the original index information is obtained in a case that the matching result is that the information content successfully matches the original index information in the original index information set, and the hash value, the intra-block index, and the block height in an information index may then be obtained. The intra-block index represents a position of the information content in the to-be-matched block. Finally, the variant index information set may be generated according to the sensitivity level, the hash value, the intra-block index, and the block height of the original index information. Alternatively, the variant index information set is generated according to the sensitivity level and the hash value of the original index information. Alternatively, the variant index information set is generated according to the sensitivity level, the intra-block index, and the block height of the original index information. In the foregoing manner, the generated variant index information set may include different information. Three types of usable variant index information sets are listed herein, and information may be matched according to an actual requirement, thereby improving the flexibility and applicability of the solution.

Figure 10:
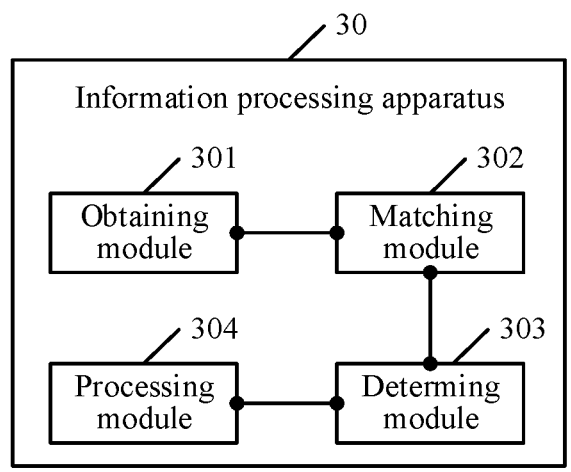
FIG. 10 is a schematic diagram of an embodiment of a blockchain-based information processing apparatus according to an embodiment of this application.

In some embodiments, based on the embodiment corresponding to FIG. 9, referring to FIG. 10, in another embodiment of the information processing apparatus 30 provided in the embodiments of this application, the information processing apparatus 30 further includes a processing module 304, where the processing module 304 is configured to: receive request information after the determining module 303 determines a variant index information set, the request information carrying a to-be-detected information index;

detect the to-be-detected information index by using the variant index information set, to obtain a detection result; and process the request information according to the detection result.

Further, in an embodiment of this application, an application method of a variant index information set is provided. After the variant index information set is generated, the request information transmitted by the client may further be received, and the to-be-detected information index is then detected by using the variant index information set, to obtain the detection result, and finally, the request information is processed according to the detection result. In the foregoing manner, an information index is detected by using the variant index information set, so that the risk brought to a blockchain application by security supervision on blockchain content can be effectively resolved, and the information index is transmitted to providers of blockchain services, thereby avoiding potential security hazards brought by direct transmission of original index information.

Further, an embodiment of this application provides a method for detecting a to-be-detected information index by using a variant index information set to obtain a detection result. First, the target hash value is determined according to the to-be-detected information index, and the target hash value is then matched by using the variant index information set. It is determined, when the target hash value successfully matches the variant index information in the variant index information set, the to-be-detected information index is sensitive transaction information, and it is determined, when the target hash value fails to match the variant index information in the variant index information set, that the to-be-detected information index is secure transaction information. In the foregoing manner, when a user requests to browse a designated transaction, a to-be-queried hash value submitted by the user is matched against the variant index information set. Corresponding blocking is performed in a case that the hash value hits the variant index information set, and the transaction information that the user wants to browse is displayed in plaintext in a case that the hash value does not hit the variant index information set, thereby improving the security of the public transaction information.

In some embodiments, based on the embodiment corresponding to FIG. 10, in another embodiment of the information processing apparatus 30 provided in the embodiments of this application, the processing module 304 is specifically configured to: determine a target hash value according to the to-be-detected information index;

match the target hash value by using the variant index information set;

determine, when the target hash value successfully matches the variant index information in the variant index information set, that information content corresponding to the to-be-detected information index is sensitive information; and determine, when the target hash value fails to match the variant index information in the variant index information set, that information content corresponding to the to-be-detected information index is secure information.

Further, an embodiment of this application provides a method for detecting a to-be-detected information index by using a variant index information set to obtain a detection result. First, the target intra-block index and the target block height are determined according to the to-be-detected information index, and the target intra-block index and the target block height are then matched by using the variant index information set. It is determined, when the target intra-block index and the target block height successfully match the variant index information in the variant index information set, that information content corresponding to the to-be-detected information index is sensitive information, and it is determined, when the target intra-block index and the target block height fail to match the variant index information in the variant index information set, that the information content corresponding to the to-be-detected information index is secure information. In the foregoing manner, when a user requests to browse a designated transaction, a to-be-queried intra-block index and a to-be-queried block height that are submitted by the user are matched against the variant index information set. Corresponding blocking is performed in a case that the intra-block index and the block height hit the variant index information set, and the information that the user wants to browse is displayed in plaintext in a case that the intra-block index and the block height fail to hit the variant index information set, thereby improving the security of public information.

In some embodiments, based on the embodiment corresponding to FIG. 10, in another embodiment of the information processing apparatus 30 provided in the embodiments of this application, the processing module 304 is specifically configured to: determine a target intra-block index and a target block height according to the to-be-detected information index;

match the target intra-block index and the target block height by using the variant index information set;

determine, when the target intra-block index and the target block height successfully match the variant index information in the variant index information set, that the to-be-detected information index is sensitive transaction information; and determine, when the target intra-block index and the target block height fail to match the variant index information in the variant index information set, that information content corresponding to the to-be-detected information index is secure information.

Further, an embodiment of this application provides a method for detecting a to-be-detected information index by using a variant index information set to obtain a detection result. First, the target intra-block index and the target block height are determined according to the to-be-detected information index, and the target intra-block index and the target block height are then matched by using the variant index information set. It is determined, when the target intra-block index and the target block height successfully match the variant index information in the variant index information set, that information content corresponding to the to-be-detected information index is sensitive information, and it is determined, when the target intra-block index and the target block height fail to match the variant index information in the variant index information set, that the information content corresponding to the to-be-detected information index is secure information. In the foregoing manner, when a user requests to browse a designated transaction, a to-be-queried intra-block index and a to-be-queried block height that are submitted by the user are matched against the variant index information set. Corresponding blocking is performed in a case that the intra-block index and the block height hit the variant index information set, and the information that the user wants to browse is displayed in plaintext in a case that the intra-block index and the block height fail to hit the variant index information set, thereby improving the security of public information.

In some embodiments, based on the embodiment corresponding to FIG. 10, in another embodiment of the information processing apparatus 30 provided in the embodiments of this application, the processing module 304 is specifically configured to: obtain target information content according to the to-be-detected information index when information content corresponding to the to-be-detected information index is secure information; and transmit the target information content to a client, to enable the client to display the target information content.

Further, in an embodiment of this application, a method for processing target information content corresponding to a to-be-detected information index according to a detection result is provided. In a case that the to-be-detected information index is secure transaction information, the target information content is obtained according to the to-be-detected information index, and the target information content is transmitted to the client, to enable the client to display the target information content. In the foregoing manner, for information corresponding to a secure information index, complete information content may be displayed on the client in plaintext, to provide a user with more complete information while ensuring security, thereby improving the reliability and feasibility of the solution.

In some embodiments, based on the embodiment corresponding to FIG. 10, in another embodiment of the information processing apparatus 30 provided in the embodiments of this application, the processing module 304 is specifically configured to: determine a target sensitivity level and a target service type according to the to-be-detected information index when information content corresponding to the to-be-detected information index is sensitive information;

determine, according to the target sensitivity level and the target service type, whether to display target information content corresponding to the to-be-detected information index;

transmit prompt information to the client in a case of determining not to display the target information content, to enable the client to display the prompt information, the prompt information being used for prompting a user that the target information content is the sensitive information; and process the target information content in a case of determining to display the target information content, to obtain processed target information content, and transmit the processed target information content to the client, to enable the client to display the processed target information content.

Further, in an embodiment of this application, a method for processing target information content according to a detection result is provided. In a case that the information content corresponding to the to-be-detected information index is the sensitive information, the target sensitivity level and the target service type are determined according to the to-be-detected information index, and it is then determined, according to the target sensitivity level and the target service type, whether to display the target information content corresponding to the to-be-detected information index. The prompt information is transmitted to the client in a case that the target information content is not displayed, to enable the client to display the prompt information, and the target information content is processed in a case that the target information content is displayed, to obtain the processed target information content. In the foregoing manner, it may further be selected, according to a specific service requirement, whether to completely block the sensitive information, thereby improving the flexibility of information processing.

In some embodiments, based on the embodiment corresponding to FIG. 10, in another embodiment of the information processing apparatus 30 provided in the embodiments of this application, The processing module 304 is specifically configured to: obtain the target information content;

match the target information content by using the original index information set, and determine target index information in the target information content; and block the target index information in the target information content, to obtain the processed target information content.

Further, in an embodiment of this application, a method for processing target information content is provided. That is, the target information content is obtained, the target information content is then matched by using the original index information set, the target index information in the target information content is determined, the target index information in the target information content is then blocked, to obtain the processed transaction information, and finally, the processed transaction information is transmitted to the client, to enable the client to display the processed transaction information. In the foregoing manner, only partial index information may be blocked, thereby improving the security of the information. Meanwhile, the partial display of non-index information helps a user to obtain partial information, thereby improving the feasibility of the solution.

Figure 11:
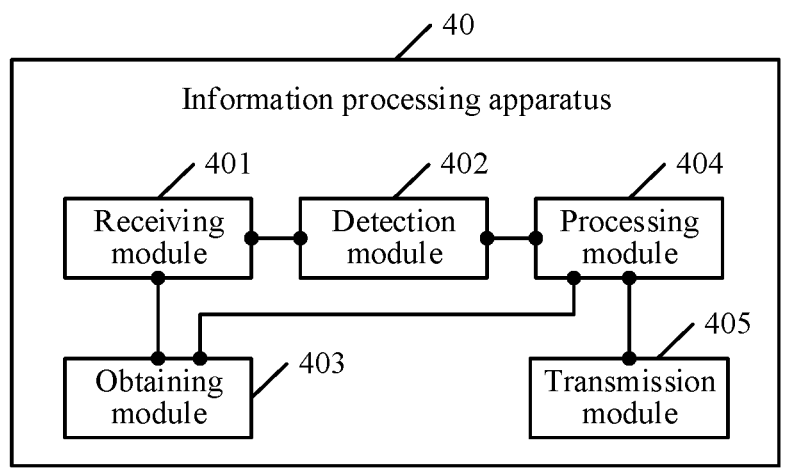
FIG. 11 is a schematic diagram of an embodiment of a blockchain-based information processing apparatus according to an embodiment of this application.

A blockchain-based information processing apparatus in the embodiments of this application is described below in detail. FIG. 11 is a schematic diagram of an embodiment of a blockchain-based information processing apparatus according to an embodiment of this application. The information processing apparatus 40 includes:

a receiving module 401, configured to receive request information from a client, the request information carrying a to-be-detected information index;

a detection module 402, configured to detect, by using a variant index information set, the to-be-detected information index carried by the request information received by the receiving module 401, to obtain a detection result, the variant index information set including at least one piece of variant index information, the variant index information including an information index in information;

an obtaining module 403, configured to obtain information content corresponding to the to-be-detected information index;

a processing module 404, configured to process, according to the detection result detected by the detection module 402, the information content corresponding to the to-be-detected information index obtained by the obtaining module 403, to obtain processed transaction information; and a transmission module 405, configured to transmit the processed transaction information obtained by the processing module 404 to the client, to enable the client to display the processed transaction information.

In some embodiments, the detection module 402 is configured to:

determine a target hash value according to the to-be-detected information index;

match the target hash value by using the variant index information set;

determine, when the target hash value successfully matches the variant index information in the variant index information set, that information content corresponding to the to-be-detected information index is sensitive information; and determine, when the target hash value fails to match the variant index information in the variant index information set, that information content corresponding to the to-be-detected information index is secure information.

In some embodiments, the detection module 402 is configured to:

determine a target intra-block index and a target block height according to the to-be-detected information index;

match the target intra-block index and the target block height by using the variant index information set;

determine, when the target intra-block index and the target block height successfully match the variant index information in the variant index information set, that information content corresponding to the to-be-detected information index is sensitive transaction information; and determine, when the target intra-block index and the target block height fail to match the variant index information in the variant index information set, that information content corresponding to the to-be-detected information index is secure information.

In some embodiments, the processing module 404 is configured to:

determine a target sensitivity level and a target service type according to the to-be-detected information index when information content corresponding to the to-be-detected information index is sensitive information;

determine, according to the target sensitivity level and the target service type, whether to display target information content corresponding to the to-be-detected information index; and process the target information content in a case of determining to display the target information content, to obtain the processed information.

In some embodiments, the information processing apparatus 40 further includes: a matching module and a determining module (not shown in the figure).

The obtaining module 403 is further configured to obtain an original index information set, the original index information set including at least one piece of original index information, each piece of original index information including plaintext sensitive content.

The obtaining module 403 is further configured to obtain the information in a to-be-matched block, the information including information content and an information index, the information content having a correspondence with the information index.

The matching module is configured to match the information content in the information by using the original index information set, to obtain a matching result.

The determining module is configured to determine a variant index information set when the matching result indicates that the matching succeeds, the variant index information set comprising at least one piece of variant index information, the variant index information comprising the information index corresponding to the information content in the information.

In some embodiments, the determining module is configured to:

obtain a sensitivity level of the original index information when the matching result indicates that the information successfully matches the original index information in the original index information set;

obtain a hash value, an intra-block index, and a block height in the information index, the intra-block index representing a position of the information in the to-be-matched block; and generate the variant index information set according to the sensitivity level, the hash value, the intra-block index, and the block height of the original index information.

In this embodiment, the receiving module 401 receives request information, the request information carrying a to-be-detected information index, the detection module 402 detects, by using a variant index information set, the to-be-detected information index carried by the request information received by the receiving module 401, to obtain a detection result, the variant index information set including at least one piece of variant index information, the variant index information including an information index in information, the obtaining module 403 obtains information content corresponding to the to-be-detected information index, the processing module 404 processes, according to the detection result detected by the detection module 402, the information content corresponding to the to-be-detected information index obtained by the obtaining module 403, to obtain processed transaction information, and the transmission module 405 transmits the processed transaction information processed by the processing module 404 to the client, to enable the client to display the processed transaction information.

In an embodiment of this application, a blockchain-based information processing method is provided. First, a transaction request transmitted by a client is received, and a to-be-detected information index carried by the transaction request is then detected by using a variant index information set, to obtain a detection result, target information content corresponding to the to-be-detected information index is obtained, finally, the target information content is processed according to the detection result, to obtain processed transaction information, and the processed transaction information is transmitted to the client, to enable the client to display the processed transaction information. In the foregoing manner, the transaction information is detected by using the variant index information set, so that the risk brought to a blockchain application by security supervision on blockchain content can be effectively resolved, and index information is transmitted to providers of blockchain services, thereby avoiding potential security hazards brought by direct transmission of the original index information set. In addition, the transaction may further be processed, to obtain the processed transaction information, and the transmission of the processed transaction information can further improve security of the solution.

Figure 12:
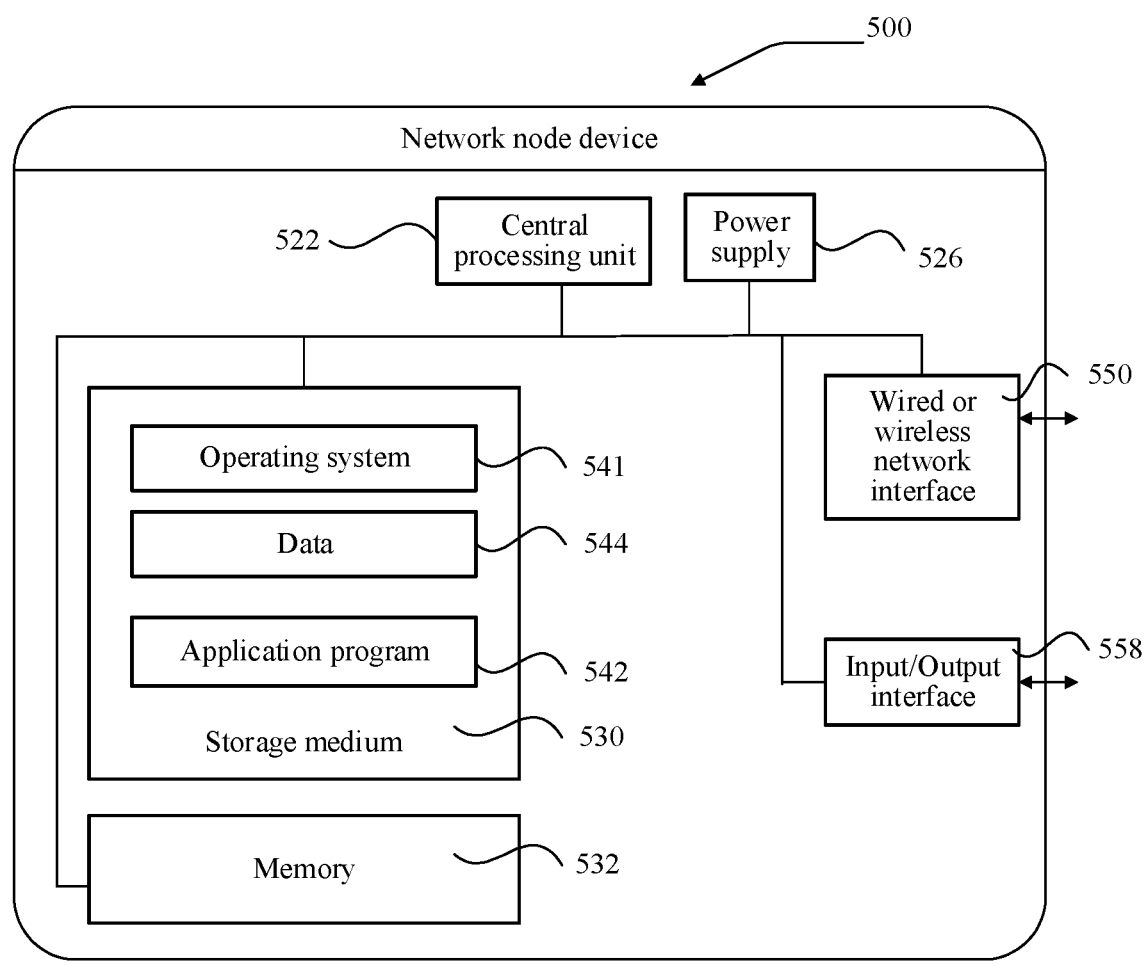
FIG. 12 is a schematic structural diagram of a network node device according to an embodiment of this application.

FIG. 12 is a schematic structural diagram of a network node device according to an embodiment of this application. A network node device 500 may vary greatly due to different configurations or performance, and may include one or more central processing units (CPU) 522 (for example, one or more processors) and a memory 532, and one or more storage media 530 (for example, one or more mass storage devices) that store applications 542 or data 544. The memory 532 and the storage medium 530 may be temporary storage or persistent storage. The program stored in the storage medium 530 may include one or more modules (not shown in the figure), and each module may include a series of instructions and operations for the network node device. Furthermore, the CPUs 522 may be configured to communicate with the storage mediums 530, and perform, on the network node device 500, the series of instruction operations in the storage mediums 530.

The network node device 500 may further include one or more power supplies 526, one or more wired or wireless network interfaces 550, one or more input/output interfaces 558, and/or one or more operating systems 541, for example, Windows Server™, Mac OS X™, Unix™, Linux™ or FreeBSD™.

Steps performed by the network node device in the foregoing embodiments may be based on the structure of the network node device shown in FIG. 12.

In this embodiment of this application, the CPU 522 is configured to perform the following steps:

obtaining an original index information set, the original index information set including at least one piece of original index information, each piece of original index information including plaintext sensitive content;

obtaining information in to-be-matched blocks in a blockchain system, the information including information content and an information index, the information content having a correspondence with the information index;

matching the information content in the information by using the original index information set, to obtain a matching result; and determining a variant index information set when the matching result indicates that the matching succeeds, the variant index information set comprising at least one piece of variant index information, the variant index information comprising the information index corresponding to the information content in the information.

In this embodiment of this application, the CPU 522 is configured to perform the following steps:

receiving request information from a client, the request information carrying a to-be-detected information index;

detecting, by using a variant index information set, the to-be-detected information index carried by the request information, to obtain a detection result, the variant index information set including at least one piece of variant index information, the variant index information including an information index in information;

obtaining information content corresponding to the to-be-detected information index;

processing the information content corresponding to the to-be-detected information index according to the detection result, to obtain processed transaction information; and transmitting the processed transaction information to the client, to enable the client to display the processed transaction information.

A person skilled in the art may clearly understand that, for the purpose of convenient and brief description, for specific work processes of the foregoing described system, apparatus, and unit, reference may be made to corresponding processes in the foregoing method embodiments, and details are not described herein again.

In the embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate parts can or cannot be physically separate. Parts displayed as units can or cannot be physical units, and can be located in one position, or can be distributed on a plurality of network units. Some or all of the units can be selected according to actual requirements to achieve the objectives of the solutions in the embodiments.

In addition, functional units in the embodiments of this application can be integrated into one processing unit, or each of the units can exist alone physically, or two or more units are integrated into one unit. The integrated unit may be implemented in the form of hardware, or may be implemented in the form of a software function unit.

When the integrated unit is implemented in the form of a software functional unit and sold or used as an independent product, the integrated unit may be stored in a computer-readable storage medium. Based on such an understanding, the technical solutions of this application essentially, or the part contributing to the related art, or the entire or some of the technical solutions may be implemented in a form of a software product. The computer software product is stored in a storage medium and includes several instructions for instructing a computer device (which may be a PC, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing embodiments are merely provided for describing the technical solutions of this application, but not intended to limit this application. A person of ordinary skill in the art shall understand that although this application has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of this application.

What is claimed is:

1. A blockchain-based information processing method, performed by a network node device having a memory and a processor configured to execute a plurality of programs stored in the memory, and the method comprising:

obtaining an original index information set, the original index information set comprising at least one piece of original index information, each piece of original index information comprising plaintext sensitive content;

obtaining information in to-be-matched blocks in a blockchain system, the information comprising information content and an information index, the information content having a correspondence with the information index;

matching the information content in the information by using the original index information set, to obtain a matching result; and determining a variant index information set when the matching result indicates that the matching succeeds, the variant index information set comprising at least one piece of variant index information, the variant index information comprising the information index corresponding to the information content in the information.

2. The method according to claim 1, wherein the matching the information content in the information by using the original index information set comprises:

matching first information content by using the original index information set, the first information content being part of the information; and when the first information content does not match the original index information in the original index information set:

matching information content in a second block in a case that the first information content is the last piece of information in a first block, the first block being a block of the to-be-matched blocks, the second block being another block of the to-be-matched blocks, the second block being a next block adjacent to the first block; or obtaining second information content in a first block in a case that the first information content is not the last piece of information in the first block, and matching the second information content by using the original index information set, the second information content being a next piece of information content adjacent to the first information content.

3. The method according to claim 1, wherein the determining a variant index information set comprises:

obtaining a sensitivity level of the original index information when the matching result indicates that the information successfully matches the original index information in the original index information set;

obtaining a hash value, an intra-block index, and a block height in the information index, the intra-block index representing a position of the information in the to-be-matched block; and generating the variant index information set according to the sensitivity level, the hash value, the intra-block index, and the block height of the original index information.

4. The method according to claim 1, wherein after the determining a variant index information set, the method further comprises:

receiving request information from a client, the request information carrying a to-be-detected information index;

detecting the to-be-detected information index by using the variant index information set, to obtain a detection result; and processing the request information according to the detection result.

5. The method according to claim 4, wherein the detecting the to-be-detected information index by using the variant index information set, to obtain a detection result comprises:

determining a target hash value according to the to-be-detected information index;

matching the target hash value by using the variant index information set;

determining, when the target hash value successfully matches the variant index information in the variant index information set, that information content corresponding to the to-be-detected information index is sensitive information; and determining, when the target hash value fails to match the variant index information in the variant index information set, that information content corresponding to the to-be-detected information index is secure information.

6. The method according to claim 4, wherein the detecting the to-be-detected information index by using the variant index information set, to obtain a detection result comprises:

determining a target intra-block index and a target block height according to the to-be-detected information index;

matching the target intra-block index and the target block height by using the variant index information set;

determining, when the target intra-block index and the target block height successfully match the variant index information in the variant index information set, that information content corresponding to the to-be-detected information index is sensitive information; and determining, when the target intra-block index and the target block height fail to match the variant index information in the variant index information set, that information content corresponding to the to-be-detected information index is secure information.

7. The method according to claim 4, wherein the processing the request information according to the detection result comprises:

obtaining target information content according to the to-be-detected information index when information content corresponding to the to-be-detected information index is secure information; and transmitting the target information content to the requesting client, to enable the client to display the target information content.

8. The method according to claim 7, wherein the processing the request information according to the detection result comprises:

determining a target sensitivity level and a target service type according to the to-be-detected information index when information content corresponding to the to-be-detected information index is sensitive information;

determining, according to the target sensitivity level and the target service type, whether to display target information content corresponding to the to-be-detected information index;

transmitting prompt information to the client for display in a case of determining not to display the target information content, the prompt information being used for prompting a user that the target information content is the sensitive information; and processing the target information content in a case of determining to display the target information content, to obtain processed target information content, and transmitting the processed target information content to the client, to enable the client to display the processed target information content.

9. The method according to claim 8, wherein the processing the target information content, to obtain processed target information content comprises:

obtaining the target information content;

matching the target information content by using the original index information set, and determining target index information included in the target information content; and blocking the target index information in the target information content, to obtain the processed target information content.

10. A computing device acting as a network node device for implementing a blockchain-based information processing method, comprising a memory and a processor, the memory being configured to store a plurality of programs;

the processor being configured to execute the plurality of programs in the memory, to implement a plurality of operations including:

obtaining an original index information set, the original index information set comprising at least one piece of original index information, each piece of original index information comprising plaintext sensitive content;

obtaining information in to-be-matched blocks in a blockchain system, the information comprising information content and an information index, the information content having a correspondence with the information index;

matching the information content in the information by using the original index information set, to obtain a matching result; and determining a variant index information set when the matching result indicates that the matching succeeds, the variant index information set comprising at least one piece of variant index information, the variant index information comprising the information index corresponding to the information content in the information.

11. The computing device according to claim 10, wherein the matching the information content in the information by using the original index information set comprises:

matching first information content by using the original index information set, the first information content being part of the information; and when the first information content does not match the original index information in the original index information set:
matching information content in a second block in a case that the first information content is the last piece of information in a first block, the first block being a block of the to-be-matched blocks, the second block being another block of the to-be-matched blocks, the second block being a next block adjacent to the first block; or
obtaining second information content in a first block in a case that the first information content is not the last piece of information in the first block, and matching the second information content by using the original index information set, the second information content being a next piece of information content adjacent to the first information content.

12. The computing device according to claim 10, wherein the determining a variant index information set comprises:
obtaining a sensitivity level of the original index information when the matching result indicates that the information successfully matches the original index information in the original index information set;
obtaining a hash value, an intra-block index, and a block height in the information index, the intra-block index representing a position of the information in the to-be-matched block; and
generating the variant index information set according to the sensitivity level, the hash value, the intra-block index, and the block height of the original index information.

13. The computing device according to claim 10, wherein after the determining a variant index information set, the plurality of operations further comprise:
receiving request information from a client, the request information carrying a to-be-detected information index;
detecting the to-be-detected information index by using the variant index information set, to obtain a detection result; and
processing the request information according to the detection result.

14. The computing device according to claim 13, wherein the detecting the to-be-detected information index by using the variant index information set, to obtain a detection result comprises:
determining a target hash value according to the to-be-detected information index;
matching the target hash value by using the variant index information set;
determining, when the target hash value successfully matches the variant index information in the variant index information set, that information content corresponding to the to-be-detected information index is sensitive information; and
determining, when the target hash value fails to match the variant index information in the variant index information set, that information content corresponding to the to-be-detected information index is secure information.

15. The computing device according to claim 13, wherein the detecting the to-be-detected information index by using the variant index information set, to obtain a detection result comprises:
determining a target intra-block index and a target block height according to the to-be-detected information index;
matching the target intra-block index and the target block height by using the variant index information set;
determining, when the target intra-block index and the target block height successfully match the variant index information in the variant index information set, that information content corresponding to the to-be-detected information index is sensitive transaction information; and
determining, when the target intra-block index and the target block height fail to match the variant index information in the variant index information set, that information content corresponding to the to-be-detected information index is secure information.

16. The computing device according to claim 13, wherein the processing the request information according to the detection result comprises:
obtaining target information content according to the to-be-detected information index when information content corresponding to the to-be-detected information index is secure information; and
transmitting the target information content to the requesting client, to enable the client to display the target information content.

17. The computing device according to claim 16, wherein the processing the request information according to the detection result comprises:
determining a target sensitivity level and a target service type according to the to-be-detected information index when information content corresponding to the to-be-detected information index is sensitive information;
determining, according to the target sensitivity level and the target service type, whether to display target information content corresponding to the to-be-detected information index;
transmitting prompt information to the client in a case of determining not to display the target information content, to enable the client to display the prompt information, the prompt information being used for prompting a user that the target information content is the sensitive information; and
processing the target information content in a case of determining to display the target information content, to obtain processed target information content, and transmitting the processed target information content to the client, to enable the client to display the processed target information content.

18. The computing device according to claim 17, wherein the processing the target information content, to obtain processed target information content comprises:
obtaining the target information content;
matching the target information content by using the original index information set, and determining target index information in the target information content; and
blocking the target index information in the target information content, to obtain the processed target information content.

19. A non-transitory computer-readable storage medium, comprising instructions, the instructions, when executed on a computing device acting as a network node device for implementing a blockchain-based information processing method, causing the computing device to implement a plurality of operations including:
obtaining an original index information set, the original index information set comprising at least one piece of original index information, each piece of original index information comprising plaintext sensitive content;
obtaining information in to-be-matched blocks in a blockchain system, the information comprising information content and an information index, the information content having a correspondence with the information index;

matching the information content in the information by using the original index information set, to obtain a matching result; and determining a variant index information set when the matching result indicates that the matching succeeds, the variant index information set comprising at least one piece of variant index information, the variant index information comprising the information index corresponding to the information content in the information.

20. The non-transitory computer-readable storage medium according to claim 19, wherein after the determining a variant index information set, the plurality of operations further comprise:

receiving request information from a client, the request information carrying a to-be-detected information index;

detecting the to-be-detected information index by using the variant index information set, to obtain a detection result; and processing the request information according to the detection result.

* * * * *